(12) United States Patent
    Chen

(10) Patent No.: US 12,002,212 B2
(45) Date of Patent: Jun. 4, 2024

(54) IMAGE SEGMENTATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Sihong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 631 days.

(21) Appl. No.: 17/173,172

(22) Filed: Feb. 10, 2021

(65) Prior Publication Data

US 2021/0166395 A1    Jun. 3, 2021

Related U.S. Application Data

(63) Continuation of application No. PCT/CN2019/110541, filed on Oct. 11, 2019.

(30) Foreign Application Priority Data

Oct. 16, 2018 (CN) .......................... 201811205146.4

(51) Int. Cl.
    *G06T 7/11* (2017.01)
    *G06T 7/00* (2017.01)
(52) U.S. Cl.
    CPC .............. *G06T 7/11* (2017.01); *G06T 7/0012* (2013.01); *G06T 2207/20081* (2013.01)
(58) Field of Classification Search
    None
    See application file for complete search history.

(56) References Cited

U.S. PATENT DOCUMENTS

| 2008/0103383 A1* | 5/2008 | van der Kouwe | G01R 33/56 |
| | | | 600/410 |
| 2012/0094850 A1* | 4/2012 | Lubenow | C12Q 1/6881 |
| | | | 435/6.12 |

(Continued)

FOREIGN PATENT DOCUMENTS

| CN | 105608479 A | 5/2016 |
| CN | 107240102 A | 10/2017 |

(Continued)

OTHER PUBLICATIONS

The World Intellectual Property Organization (WIPO) International Search Report for PCT/CN2019/110541 dated Jan. 16, 2020 5 Pages (including translation).

(Continued)

*Primary Examiner* — Santiago Garcia
(74) *Attorney, Agent, or Firm* — ANOVA LAW GROUP, PLLC

(57) ABSTRACT

An image segmentation method is provided for an electronic device. The method includes pre-training a first initial model based on a plurality of first sample images to obtain a second initial model, the plurality of first sample images including images of a plurality of human tissues, and the second initial model including distribution information of a plurality of target regions corresponding to the plurality of human tissues, training the second initial model based on a plurality of second sample images to obtain an image segmentation model, image information of the plurality of second sample images including at least distribution information of a plurality of target regions corresponding to a target human tissue reflected in the second sample images, and feeding a first image to the image segmentation model, and segmenting, by using the image segmentation model, the first image (Continued)

according to the image information to output a second image.

20 Claims, 10 Drawing Sheets

(56) References Cited

U.S. PATENT DOCUMENTS

| | | | | |
|---|---|---|---|---|
| 2013/0210648 | A1* | 8/2013 | Hewitt | G01N 33/57484 435/7.1 |
| 2014/0023260 | A1* | 1/2014 | Huang | G06T 7/155 382/128 |
| 2016/0063720 | A1* | 3/2016 | Han | G06T 7/10 382/131 |
| 2017/0206662 | A1* | 7/2017 | Wang | G06T 7/143 |
| 2017/0231713 | A1* | 8/2017 | Siewerdsen | A61B 5/055 382/128 |
| 2017/0249744 | A1* | 8/2017 | Wang | G06T 1/60 |
| 2017/0372474 | A1* | 12/2017 | Behar | A61B 6/4441 |
| 2018/0018757 | A1* | 1/2018 | Suzuki | G06N 3/045 |
| 2018/0061058 | A1 | 3/2018 | Xu et al. | |
| 2018/0084988 | A1 | 3/2018 | Chakravorty et al. | |
| 2018/0268541 | A1* | 9/2018 | Kruecker | G06F 3/017 |
| 2019/0096060 | A1 | 3/2019 | Zhang et al. | |
| 2019/0205606 | A1* | 7/2019 | Zhou | G06V 20/695 |
| 2019/0228840 | A1* | 7/2019 | Kamens | G06T 7/0012 |
| 2020/0005461 | A1* | 1/2020 | Yip | A61B 5/725 |
| 2021/0244374 | A1* | 8/2021 | Zhao | A61B 6/5282 |

FOREIGN PATENT DOCUMENTS

| | | |
|---|---|---|
| CN | 107563123 A | 1/2018 |
| CN | 107665351 A | 2/2018 |
| CN | 107967491 A | 4/2018 |
| CN | 108597053 A | 9/2018 |
| CN | 109410220 A | 3/2019 |
| WO | 2018015414 A1 | 1/2018 |

OTHER PUBLICATIONS

The State Intellectual Property Office of the People's Republic of China (SIPO) Office Action 1 for 201811205146.4 dated Jul. 8, 2019 16 Pages (including translation).
The European Patent Office (EPO) The Extended European Search Report for 19874073.0 dated Nov. 18, 2021 11 Pages (including translation).
Sihong Chen et al., "Med3D: Transfer Learning for 3D Medical Image Analysis," arxiv.org, arXiv:1904.00625v3, Jun. 10, 2019 (Jun. 10, 2019) . 12 pages.
Mohsen Ghafoorian et al., "Transfer Learning for Domain Adaptation in MRI: Application in Brain Lesion Segmentation," arxiv.org, arXiv:1702.07841v1, Feb. 25, 2017 (Feb. 25, 2017). 8 pages.
Deepak Keshwani et al., "Computation of Total Kidney Volume from CT images in Autosomal Dominant Polycystic Kidney Disease using Multi-Task 3D Convolutional Neural Networks," arxiv.org, Cornell University Library, 2010LIN Library Cornell University Ithaca, NY 14853, arXiv:1809.02268v1, Sep. 7, 2018 (Sep. 7, 2018). 8 pages.
Vanya V Valinor1a et al., "Domain Adaptation for MRI Organ Segmentation using Reverse Classification Accuracy," arxiv.org, arXiv:1806.00363v1, Jun. 1, 2018 (Jun. 1, 2018) . 9 pages.
Van Opbroek Annegreet et al., "Transfer Learning Improves Supervised Image Segmentation Across Imaging Protocols," IEEE Transactions on Medical Imaging, vol. 34, No. 5, May 2015 (May 2015), pp. 1018-1030. 13 pages.

* cited by examiner

IMAGE SEGMENTATION METHOD AND APPARATUS, COMPUTER DEVICE, AND STORAGE MEDIUM

RELATED APPLICATIONS

This application is a continuation application of PCT Patent Application No. PCT/CN2019/110541, filed on Oct. 11, 2019, which claims priority to Chinese Patent Application No. 201811205146.4, entitled "IMAGE SEGMENTATION METHOD AND APPARATUS, COMPUTER DEVICE, AND STORAGE MEDIUM" and filed with the National Intellectual Property Administration, PRC on Oct. 16, 2018, all of which are incorporated herein by reference in entirety.

FIELD OF THE TECHNOLOGY

The present disclosure relates to the field of computer technologies, and in particular, to an image segmentation method and apparatus, an electronic device, and a storage medium.

BACKGROUND

With the development in computer technologies, image segmentation technology is increasingly applied to areas including medical image segmentation and natural image segmentation. The image segmentation technology is a technology of segmenting an image into several particular regions having special properties, and specifying a target of interest. For example, in a human tissue image segmentation scenario, a medical image may be segmented to identify various human tissues in the segmented image.

Certain existing image segmentation methods are generally implemented by using two models: cascaded three-dimensional fully convolutional networks (Cascaded 3D FCN) and pyramid scene parsing network (Pspnet). Among them, Cascaded 3D FCN is a three-dimensional (3D) network, which is mainly used for segmenting abdominal tissues. Pspnet is a two-dimensional (2D) network, which is mainly used for segmenting natural images. The foregoing image segmentation methods generally require technicians to analyze an image of a human tissue according to requirements of image segmentation, analyze which human tissue is to be segmented in the image, and what are the characteristics of pixel distribution of the image of such human tissue, and design a model according to an analysis result, so as to obtain a sample image of this human tissue to train the designed model, so that the trained model may be used to segment the image that needs to be segmented.

At least some of these existing image segmentation methods require technicians to analyze images and design models. If other images of human tissues need to be segmented, the technicians need to analyze other images of human tissues and redesign models. Training cannot be performed directly on the basis of the previously designed models. Therefore, the foregoing image segmentation method is met with poor versatility, applicability, or practicability.

SUMMARY

Embodiments of the present disclosure provide an image segmentation method and apparatus, an electronic device, and a storage medium. The technical solutions are as follows:

One aspect of the present disclosure provides an image segmentation method. The method includes pre-training, by an electronic device, a first initial model based on a plurality of first sample images to obtain a second initial model, the plurality of first sample images including images of a plurality of human tissues, and the second initial model including distribution information of a plurality of target regions corresponding to the plurality of human tissues, training, by the electronic device, the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue, and feeding, by the electronic device, a first image to the image segmentation model, and segmenting, by using the image segmentation model, the first image according to the image information to output a second image.

Another aspect of the present disclosure provides a data processing apparatus. The data processing apparatus includes a memory and a processor coupled to the memory. The processor is configured to perform pre-training a first initial model based on a plurality of first sample images to obtain a second initial model, the plurality of first sample images including images of a plurality of human tissues, and the second initial model including distribution information of a plurality of target regions corresponding to the plurality of human tissues, training the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue, and feeding a first image to the image segmentation model, and segmenting, by using the image segmentation model, the first image according to the image information to output a second image.

Yet another aspect of the present disclosure provides a non-transitory computer-readable storage medium. The non-transitory computer-readable storage medium stores computer program instructions executable by at least one processor to perform pre-training a first initial model based on a plurality of first sample images to obtain a second initial model, the plurality of first sample images including images of a plurality of human tissues, and the second initial model including distribution information of a plurality of target regions corresponding to the plurality of human tissues, training the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue, and feeding a first image to the image segmentation model, and segmenting, by using the image segmentation model, the first image according to the image information to output a second image.

Details of one or more embodiments of the present disclosure are provided in the accompany drawings and descriptions below. Other features, objectives, and advantages of the present disclosure will become apparent from the specification, the accompanying drawings, and the claims.

BRIEF DESCRIPTION OF THE DRAWINGS

To more clearly describe technical solutions of certain embodiments of the present disclosure, described below are accompanying drawings. The accompanying drawings are illustrative of embodiments of the present disclosure, and a person of ordinary skill in the art may still derive other drawings from these accompanying drawings without creative efforts.

DETAILED DESCRIPTION

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

Figure 1:
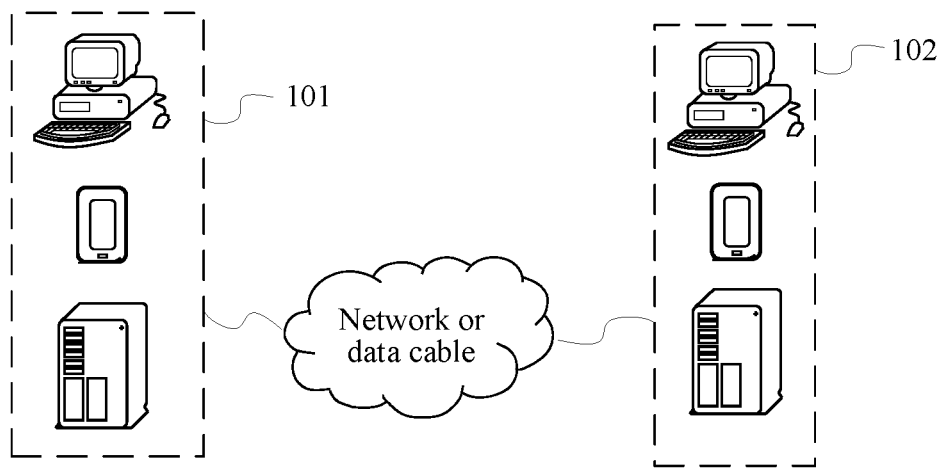
FIG. 1 is a schematic diagram of an implementation environment of an image segmentation method according to one or more embodiments of the present disclosure.

FIG. 1 is a schematic diagram of an implementation environment of an image segmentation method according to an embodiment of the present disclosure. Referring to FIG. 1, the implementation environment may include a plurality of computer devices. The plurality of computer devices may implement data exchange in a wired connection manner, or may implement data exchange in a wireless network connection manner. This is not limited in the embodiments of the present disclosure.

In certain embodiments of the present disclosure, an electronic device 101 may be configured to segment an image. In certain embodiments, the image may be a medical image, that is, an image of a human tissue. The image segmentation method provided in the embodiments of the present disclosure is applicable to human tissue image segmentation scenarios, for example, human tissue image segmentation scenarios such as liver cancer segmentation, brain cancer and peripheral injury segmentation, lung cancer segmentation, pancreatic cancer segmentation, colorectal cancer segmentation, microvascular invasion of liver segmentation, hippocampus structure segmentation, prostate structure segmentation, left atrium segmentation, pancreas segmentation, liver segmentation, or spleen segmentation, and may alternatively be other human tissue image segmentation scenarios. The image may be an image of another type, and the image segmentation method is alternatively applicable to another image segmentation scenario, such as a scenery image segmentation scenario.

An electronic device 102, which may be a computer or computing device, may be configured to capture an image and send the captured image to the electronic device 101, for the computer device 101 to provide an image segmentation service. In certain embodiments, the electronic device 101 may alternatively capture an image, and segment the captured image. This is not limited in the embodiments of the present disclosure. In certain embodiments, the electronic device 102 may alternatively be configured to store an image obtained from another computer device, and the electronic device 101 may obtain the stored image from the electronic device 102 for segmentation.

In certain particular embodiments, both the electronic device 101 and the electronic device 102 may be provided as terminals, or be provided as servers. This is not limited in the embodiments of the present disclosure.

Figure 2:
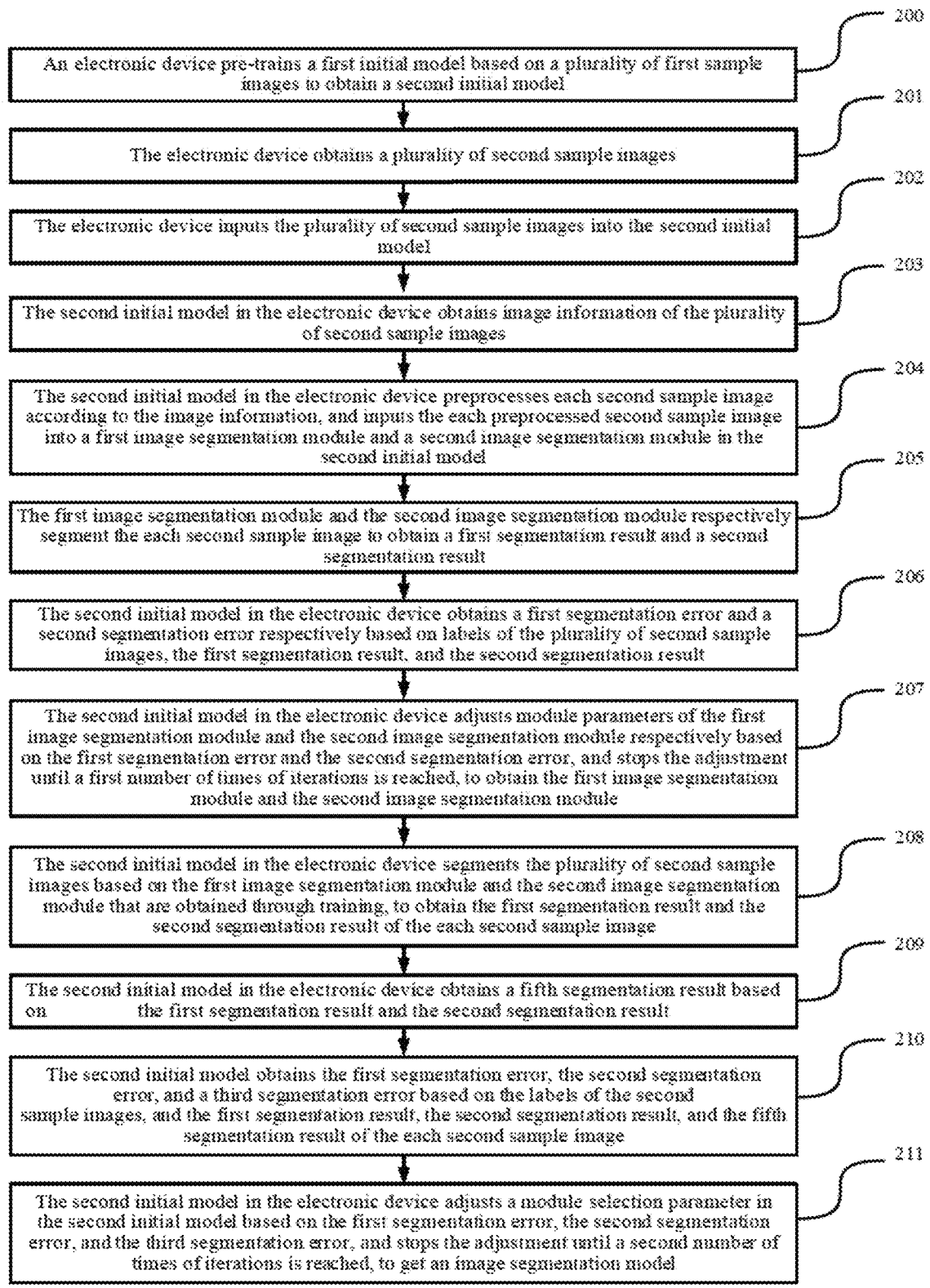
FIG. 2 is a flowchart of an image segmentation model training method according to one or more embodiments of the present disclosure.

FIG. 2 is a flowchart of an image segmentation model training method according to an embodiment of the present disclosure. The image segmentation model training method is applicable to an electronic device, and the electronic device may be the electronic device 101 in the foregoing implementation environment, or may be another electronic device. That is, an image segmentation model may be obtained through training on the electronic device 101, or an image segmentation model may be obtained through training on another electronic device, and then the image segmentation model is processed as a configuration file. The configuration file is sent to the electronic device 101, and therefore, the electronic device 101 stores an image segmentation model. The electronic device 101 may alternatively invoke an image segmentation model obtained through training on another electronic device when there is an image segmentation requirement. This is not limited in the embodiments of the present disclosure. Referring to FIG. 2, the method may include the following steps:

200. An electronic device pre-trains a first initial model based on a plurality of first sample images to obtain a second initial model.

The term "pre-train" or "pre-trains" or "pre-training" or "pre-trained" may also be understood as "train" or "trains" or "training" or "trained," respectively. In certain embodiments, however, the term "pre-training" refers to a process step which occurs prior to another process step or particularly prior to another training step. In certain particular embodiments, the term "pre-training" refers to pre-training the first initial model, which occurs prior to the process step of training the second initial model.

The plurality of first sample images include images of a plurality of human tissues. For example, the plurality of first sample images may include images of human tissues such as liver images, brain images, lung images, pancreas images, large intestine images, images of a hippocampus part, images of a prostate part, images of a heart part, and spleen images. It may further include more images of other parts, and only an exemplary description is provided here. A number of types and specific types of the images of the plurality of human tissues are not limited herein.

In step 200, the electronic device obtains a model parameter of the second initial model through pre-training based on the images of the plurality of human tissues, and the second initial model includes distribution information of a plurality of target regions corresponding to the plurality of human tissues. That is, prior knowledge is obtained by segmenting the images of the plurality of human tissues. In this way, the model is pre-trained with data from different scenarios, so that the second initial model has related knowledge of segmentation of human tissue images, and may be configured to simulate that a medical student cycles around every department, and therefore the medical students may have certain medical knowledge or clinical knowledge.

In this way, the second initial model already has certain prior knowledge. When an image of a human tissue needs to be segmented subsequently, the second initial model may be directly trained by using sample images of this human tissue without requiring related technicians to analyze the image of the human tissue and redesign a model. That is, the second initial model has certain medical knowledge, and various images of human tissues may be directly trained by using the second initial model, which can effectively improve the practicability and versatility of the second initial model and an image segmentation model obtained through training based on the second initial model.

201: The electronic device obtains a plurality of second sample images, where each second sample image carries a label, and the label is used for indicating a target segmentation result of the second sample image.

The electronic device may obtain an image segmentation model through training based on a plurality of second sample images. In certain embodiments, the plurality of second sample images may be stored in the electronic device and can be obtained when image segmentation model training needs to be performed. Each second sample image may further carry a label used for indicating a target segmentation result, where the target segmentation result refers to a correct segmentation result of the second sample image, or an actual segmentation result of the second sample image. In this way, in a process of model training, whether the model during training accurately segments the second sample image may be known, and whether there is a need to continue training the model may be known, so that the target segmentation result or a result quite close to the target segmentation result may be obtained when the second sample image is segmented by using the trained model.

In certain embodiments, the plurality of second sample images may alternatively be stored in another electronic device. When image segmentation model training is required, the electronic device may obtain the plurality of second sample images from the another electronic device. This is not limited in the embodiments of the present disclosure.

For example, the plurality of second sample images may be stored in an image database, and each second sample image also carries a label. Step 201 may be that the electronic device obtains the plurality of second sample images from the image database.

202: The electronic device inputs the plurality of second sample images into the second initial model.

In certain embodiments, after step 200, the electronic device may directly train the second initial model, that is, step 201 is performed, and then step 202 is performed. Accordingly, in step 202, after obtaining a plurality of second sample images, the electronic device may train the second initial model based on the plurality of second sample images to obtain an image segmentation model, for accurately segmenting an acquired first image based on the image segmentation model subsequently. In certain embodiments, after step 200, the electronic device may further store the second initial model, or send the second initial model to another electronic device, for the another electronic device to perform the subsequent model training process based on the second initial model. Accordingly, in step 202, after obtaining a plurality of second sample images, the electronic device may invoke a second initial model, and input the plurality of second sample images into the second initial model. A specific implementation is not limited in the embodiments of the present disclosure.

That is, the electronic device in step 202 may store the second initial model, and directly invoke the second initial model when image segmentation model training is required, or directly perform training based on the obtained second initial model after step 200 without invoking. The second initial model may be stored alternatively in another electronic device. When image segmentation model training is required, the electronic device may invoke the second initial model from the another electronic device. This is not limited in the embodiments of the present disclosure.

The model parameter of the second initial model is an initial value, and the electronic device may use the plurality of second sample images as training samples and verification samples to train the second initial model, that is, to adjust the model parameter of the second initial model through the second sample images. Therefore, a segmentation result obtained when the second initial model whose model parameter has been adjusted for a plurality of times segments the first image is more accurate.

In certain particular embodiments, the electronic device inputs the plurality of second sample images into the second initial model, and each second sample image may be segmented by the second initial model; determines, based on a segmentation result of the second initial model and the label of the second sample image, that is, the target segmentation result of the second sample image, a segmentation capability of the second initial model, so as to continuously improve the segmentation capability of the second initial model by adjusting the model parameter of the second initial model.

Therefore, the image segmentation model obtained through subsequent training may segment images accurately.

203. The second initial model in the electronic device obtains image information of the plurality of second sample images.

The image information includes at least distribution information of a plurality of target regions corresponding to a target human tissue. That is, the second initial model may first obtain the image information of the plurality of second sample images, to obtain certain prior knowledge and understand the distribution information of the plurality of target regions corresponding to the target human tissue to be segmented, for example, the distribution information may include distribution types, a number, and size ranges of the plurality of target regions. Other information may also be included, which is not listed one by one in the embodiments of the present disclosure.

The second initial model may initially obtain one or more segmentation rules and processing rules of the first image that needs to be segmented after the subsequent model training is completed based on related situations of the plurality of second sample images.

In certain particular embodiments, the second initial model may perform connected domain processing on the plurality of second sample images based on the information in the labels of the plurality of second sample images, and perform topology analysis on the plurality of second sample images on which the connected domain processing is performed, to obtain the distribution information of the plurality of target regions corresponding to the target human tissue. The target region refers to a region in which pixels of a target type in the plurality of second sample images are located.

In certain embodiments, the image information may further include attribute information of each second sample image, so as to perform preprocessing on the second sample image based on the attribute information of the second sample image, to make basic information of the second sample image more unified or more accurate, and therefore, the segmentation on the second sample image is more accurate. Postprocessing may alternatively be performed on the segmented image to make the segmentation result more accurate. The attribute information may include a grayscale range, a modality number, and a size range. This is not limited in the embodiments of the present disclosure.

The term "preprocessing" or "preprocessed" may also be understood as "processing" or "processed," respectively. Likewise, the term "postprocessing" or "postprocessed" may also be understood as "processing" or "processed," respectively. In certain embodiments, however, the term "preprocessing" refers to a process step occurring prior to one or more other process steps and the term "postprocessing" refers to a process step occurring after one or more other process steps.

In certain embodiments, both the first initial model and the second initial model may include a first image segmentation module and a second image segmentation module. The first image segmentation module and the second image segmentation module respectively correspond to one segmentation algorithm, where the first image segmentation module is configured to segment 3D images, and the second image segmentation module is configured to segment 2D images. Accordingly, the image segmentation model obtained based on the second initial model through training may also include two image segmentation modules. The image segmentation model obtained in this way may directly segment 3D images, or convert 3D images into 2D images for segmentation. 2D images may also be segmented directly, and an image may be segmented by flexibly selecting different segmentation manners through two segmentation algorithms, which may effectively improve the practicability of the image segmentation model, and may also improve the accuracy of image segmentation.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

In this way, in step 203, the image information obtained by the electronic device may further include an image number of the plurality of second sample images, so as to select image segmentation submodules as the second image segmentation module based on the image number. In certain particular embodiments, how to select a processing manner for the second sample image based on the image number may refer to a process of selecting the image segmentation submodules of the second image segmentation module in step 205 below.

In the following, descriptions are all made by using an example that it is obtained in step 203 that the image information includes the distribution information of the plurality of target regions corresponding to the target human tissue, the attribute information of the each second sample image, and the image number of the plurality of second sample images, and the first initial model, the second initial model, and the image segmentation model each include the first image segmentation module and the second image segmentation module.

204. The second initial model in the electronic device preprocesses the each second sample image according to the image information, and inputs the each preprocessed second sample image into the first image segmentation module and the second image segmentation module in the second initial model.

Step 204 is a process of preprocessing the each second sample image based on the attribute information of the each second sample image, and inputting the preprocessed plurality of second sample images into the first image segmentation module and the second image segmentation module. That is, data on which the preprocessing in step 204 is based is the attribute information of the each second sample image in the image information.

The second initial model may preprocess the second sample image, to enable the preprocessed second sample image to meet an image segmentation condition of the first image segmentation module and the second image segmentation module, or may remove an abnormal pixel in the second sample image, or normalize pixels of the first image, and therefore, the preprocessed second sample image is more accurate during image segmentation.

In certain embodiments, if the attribute information of the second sample image is different, the preprocessing process may also be different. In certain particular embodiments, the preprocessing process may include any one or more of the following steps:

Step 1: The second initial model deletes the abnormal pixel when or in response to determining that there is an abnormal pixel in the second image according to the attribute information.

In certain embodiments, the abnormal pixel refers to a pixel whose pixel value is an abnormal value, where the pixel value of the abnormal pixel is a pixel value, in a plurality of pixel values in the second sample image, having a deviation from an average value of the plurality of pixel values exceeding twice a standard deviation. In addition, a pixel value whose deviation from the average value exceeds three times the standard deviation may also be a pixel value of a highly abnormal abnormal pixel. If there is an abnormal pixel in the second sample image, the abnormal pixel in the second sample image may be deleted to prevent the abnormal pixel from affecting the segmentation result, thereby ensuring a more accurate segmentation result of the second sample image.

In certain particular embodiments, a grayscale curve of the second sample image may be obtained according to the pixel values of the plurality of pixels of the second sample image, so that an average value, a maximum value, a minimum value, or the like of the pixel values of the plurality of pixels of the second sample image may be obtained from the grayscale curve, so as to determine an abnormal pixel value. An abnormal pixel value may alternatively be determined by counting the plurality of pixel values of the second sample image in a histogram form. For example, a pixel corresponding to a pixel value whose difference from the average value is greater than a preset difference may be used as an abnormal pixel, alternatively, 80% of the plurality of pixel values of the second sample image may be used as normal values and the remaining 20% may be used as abnormal values according to difference values between the pixel values and the average value, where an abnormal value is a pixel value with a large difference from the average value, and a normal value is a pixel value with a small difference from the average value. The foregoing only provides exemplary descriptions. In certain particular embodiments, step 1 may be implemented by using any abnormal value detection algorithm or any abnormal value processing method, which is not limited in the embodiments of the present disclosure.

Step 2: The second initial model performs normalization processing on the second sample image when or in response to determining that a grayscale range of the second sample image from which the abnormal pixel has been deleted according to the attribute information is greater than a target range, to adjust the grayscale range of the second sample image to be within the target range.

A target range may also be set in the second initial model, and the target range may be preset by a related technician. For example, the target range may be [0, 255]. When the grayscale range of the second sample image is larger than the target range, normalization processing may be performed on the second sample image to adjust the grayscale range of the second sample image to be within the target range. Therefore, grayscale ranges of all second sample images are within the target range in the subsequent process of segmentation. The grayscale ranges are unified, and the second sample images are also comparable, so that the segmentation results obtained by segmenting the second sample image are also more accurate. In certain particular embodiments, the normalization processing process may be implemented by using any normalization method. For example, the grayscale range may be converted to be within the target range according to a linear function, which is not limited or described in detail in the embodiments of the present disclosure.

Step 3: The second initial model subtracts a target image mean from each pixel value of the second sample image when or in response to determining that a channel number of the second sample image is greater than 1 according to the attribute information.

The second sample image may be a color image or a grayscale image. A channel number of the color image is greater than 1, and a channel number of the grayscale image is 1. If it is determined that the second sample image is a color image according to the attribute information, the target image mean may be subtracted from each pixel value of the second sample image. In certain embodiments, the target image mean may be obtained in the process of pre-training the second initial model, that is, the target image mean may be obtained in the foregoing step 200. In certain particular embodiments, the target image mean may be an image mean of the plurality of first sample images during pre-training, that is, an average value of pixel values.

Through step 3, a range (grayscale range) of the pixel values of the second sample image may be made consistent with a range (grayscale range) of the pixel values of the first sample image during model pre-training, so that when the foregoing processing is performed on an image during model training and model using, a grayscale range of the processed image may be consistent with that of the image before processing, so that the image segmentation result is more accurate.

Step 4: The second initial model inputs the second sample image into a modality merging module when or in response to determining that a modality number of the second sample image is greater than 1 according to the attribute information, and screens, by using the modality merging module, a plurality of pixel values of the second sample image, to obtain a target number of pixel values of the preprocessed second sample image, a modality number of the preprocessed second sample image being 1.

The modality number of the second sample image may not be 1. For example, the second sample image is obtained through a plurality of imaging principles or a plurality of imaging devices, such as computed tomography (CT), magnetic resonance imaging (MRI), or positron emission computed tomography (PET). The second initial model may further perform modality merging on a multi-modality image, thereby segmenting the merged image. The modality merging module is a module in the second initial model. When the modality number of the second sample image is greater than 1, modality merging may be performed on the second sample image by using the modality merging module.

In certain particular embodiments, the process of processing the second sample image by using the modality merging module in step 4 may also be understood as that: the modality merging module may select, according to the module parameter, a target number of pixel values from the plurality of pixel values of the second sample image as pixel values of the second sample image. The target number is a number of pixel values of the second sample image whose modality number is 1. In certain embodiments, the module parameter of the modality merging module may be adjusted in the model training process, so that the selected target number of pixel values are more representative and can better represent features of the second sample image. The foregoing only provides one modality merging manner. In certain particular embodiments, the process may alternatively adopt another manner, which is not limited in the embodiments of the present disclosure.

Figure 3:
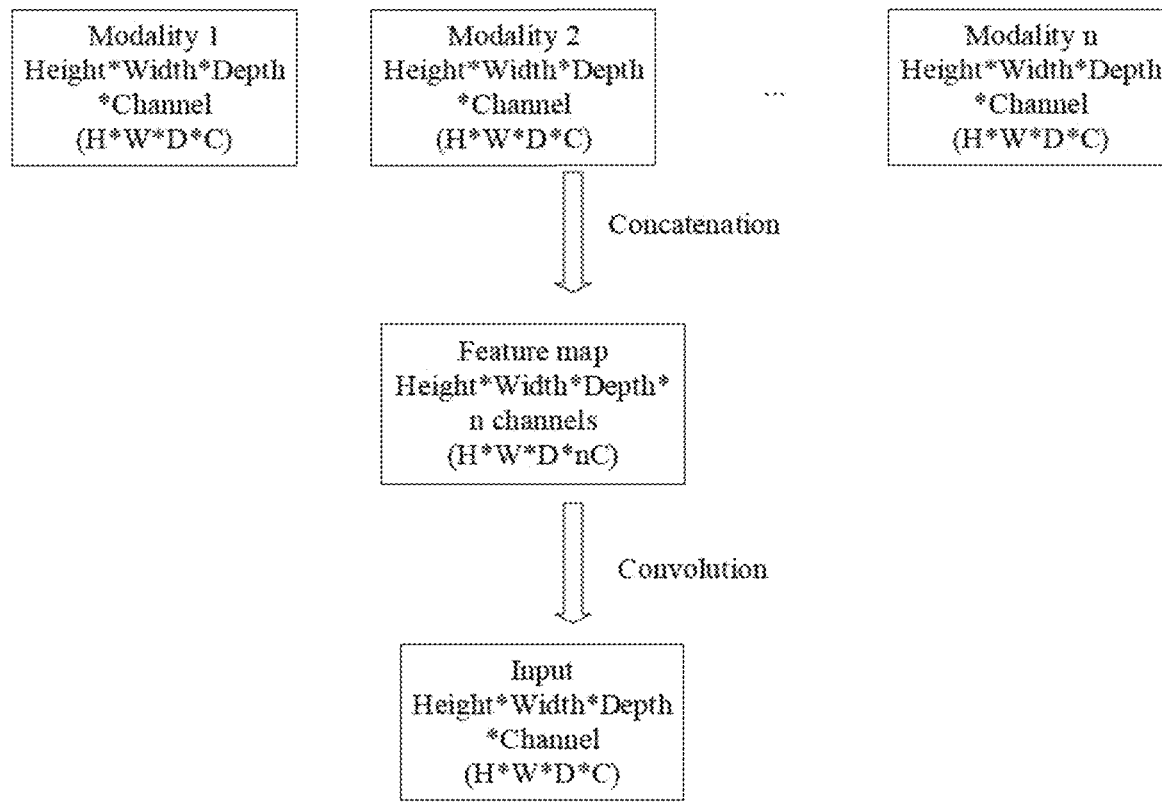
FIG. 3 is a schematic diagram of a processing procedure of a modality merging module according to one or more embodiments of the present disclosure.

For example, as shown in FIG. 3, for the modality merging module, the modality number of the second sample image may be n, n being a positive integer. The modality merging module may merge pixel values of the n modalities and perform the foregoing selection step, to finally obtain a pixel value of the second sample image to be inputted into the first image segmentation module and the second image segmentation module, thereby merging the second sample image with n modalities into a second sample image with one modality. In FIG. 3, modality refers to modality, H refers to height, W refers to width, D refers to depth, C refers to channel number, Concat refers to concatenation, Input refers to input, Convolution refers to convolution, and Featuremap refers to feature map.

Figure 4:
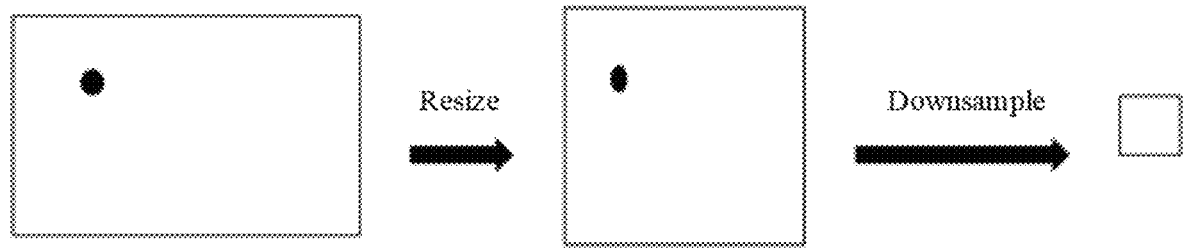
FIG. 4 is a schematic diagram of an image sampling manner according to one or more embodiments of the present disclosure.
Figure 5:
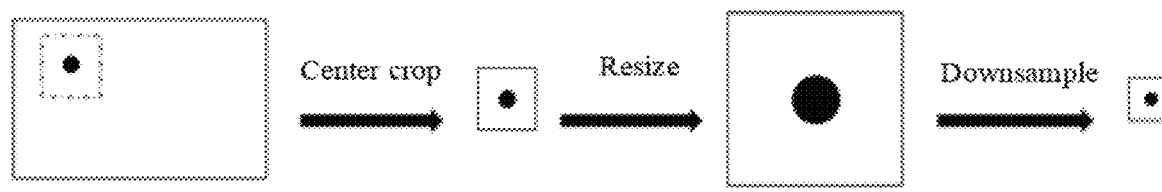
FIG. 5 is a schematic diagram of an image sampling manner according to one or more embodiments of the present disclosure.

After the second sample image is preprocessed through one or more of the foregoing steps, the preprocessed second sample image may be inputted into the first image segmentation module and the second image segmentation module for subsequent segmentation steps. The preprocessing process is not limited to the foregoing four steps. The preprocessing process may further include other steps. For example, the second initial model may sample the second sample image, and may determine a sampling manner for the second sample image based on a size range of the second sample image. For example, a downsampling multiple of the second initial model is set to 8, as shown in FIG. 4, if a size of an image that is resized and then downsampled by 8 times is larger than one pixel, the image may be directly resized. As shown in FIG. 5, if a size of an image that is resized and then downsampled by 8 times is less than one pixel, it indicates that a lot of useful information is lost in the downsampling process, and the image needs to be sampled in a multi-scale image cropping manner.

205. The first image segmentation module and the second image segmentation module respectively segment the each second sample image to obtain a first segmentation result and a second segmentation result.

For the first image segmentation module, the first image segmentation module may adopt a 2-stage flow design, that is, the first image segmentation module may perform two-stage segmentation on the second sample image, that is, two segmentations. In the first stage, the first image segmentation module may perform coarse segmentation on the second sample image, and in the second stage, the first image segmentation module may perform fine segmentation on the second sample image. In this way, segmentation tasks at different difficulty levels may be dealt with.

Figure 6:
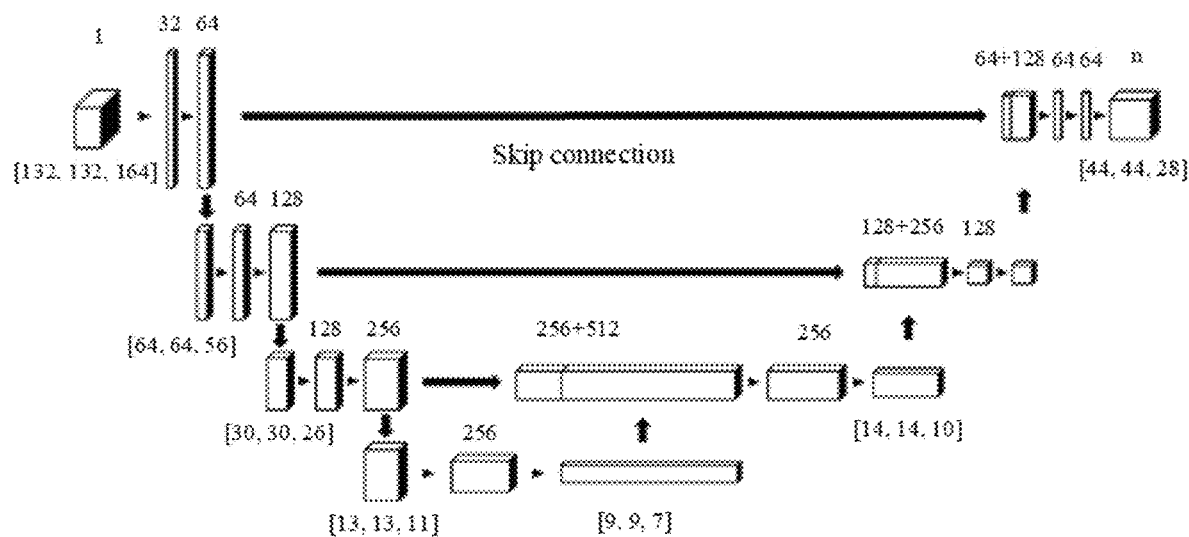
FIG. 6 is a schematic structural diagram of a 3D model according to one or more embodiments of the present disclosure.

In certain embodiments, the first image segmentation module may be implemented by using an 18-layer 3D unity networking (unet) model. FIG. 6 is a schematic structural diagram of a 3D model according to an embodiment of the present disclosure. As shown in FIG. 6, the 3D model may first perform feature extraction on the second sample image, and then perform upsampling based on an extracted feature. The feature extraction process may be implemented through steps such as convolution and pooling. In the feature extraction process, the size of the second sample image gradually decreases. In the upsampling process, upsampling may be performed by integrating data of the second sample image in the previous feature extraction process and data obtained after the feature extraction, that is, the foregoing upsampling process is implemented in a skip connection manner, to finally implement the process of segmenting the second sample image. [132, 132, 116] and [64, 64, 56] represent sizes of the image, which includes the width, the height, and the depth. 32, 64, 128, 512, and 258+512 are numbers of convolution kernels of an upper layer network, which are not described one by one herein. The embodiments of the present disclosure only use the 3D model as an example. In certain particular embodiments, the first image segmentation module may alternatively be implemented by using another model, which is not limited or described in detail in the embodiments of the present disclosure.

A process of segmenting the second sample image by using the first image segmentation module may be that: the first image segmentation module performs two classifications on the second sample image based on a module parameter of the first image segmentation module to obtain a first segmentation result, where classification objects of the first classification in the two classifications are all pixels of the second sample image, and classification objects of the second classification are foreground pixels in a result of the first classification. In this way, through the two segmentations, that is, the coarse segmentation is performed first, and then the fine segmentation is performed, the first segmentation result may be obtained with reference to results of the two segmentations, which can effectively improve the accuracy of image segmentation.

The first image segmentation module may support a plurality of types of segmentation, and the first image segmentation module may perform classification on each pixel of the second sample image and determine a type of the each pixel, that is, one of at least two types. The at least two types may be divided into two types, one is the background and the other is the foreground. Accordingly, corresponding pixels are background pixels and foreground pixels. That is, a pixel whose type is the background is a background pixel, and a pixel whose type is the foreground is a foreground pixel. The background is one of the at least two types, and the foreground is one or more types other than the background of the at least two types.

In certain particular embodiments, the two processes of segmentation may include the following step 1 to step 3:

Step 1. The first image segmentation module performs classification on the each pixel of the second sample image based on the module parameter of the first image segmentation module to obtain a third segmentation result, the third segmentation result being used for indicating a probability that the each pixel of the second sample image belongs to each of the at least two types.

Step 1 is a process of coarsely segmenting the second sample image, that is, the first stage in the 2-stage flow design. The first image segmentation module may distinguish foreground pixels and background pixels in the second sample image, so as to determine an outer contour of the target region in the second sample image. Pixels in the outer contour determined in step 1 are further classified through step 2, so as to distinguish the types of the pixels in the outer contour in more detail to determine specific distribution of the target region.

Step 2. The first image segmentation module performs classification on each foreground pixel in the third segmentation result based on the third segmentation result and the module parameter of the first image segmentation module to obtain a fourth segmentation result, the fourth segmentation result being used for indicating a probability that the each foreground pixel in the third segmentation result belongs to each of the at least two types.

In step 2, the background pixels in the third segmentation result are ignored, and only the foreground pixels are classified again, so as to perform classification on the pixels in the outer contour of the target region in more detail to obtain a more detailed segmentation result. Step 2 is a process of finely segmenting the second sample image, that is, the second stage in the 2-stage flow design. The first image segmentation module may perform classification on the pixels determined as the foreground pixels again, and determine which type of the at least two types to which the each pixel belongs again.

Step 3. The first image segmentation module obtains the first segmentation result based on the third segmentation result and the fourth segmentation result.

After the coarse segmentation and the fine segmentation are performed to obtain the third segmentation result and the fourth segmentation result, the first image segmentation module may further integrate the two segmentation results to determine the first segmentation result of the second sample image. In certain embodiments, for background pixels in the coarse segmentation, segmentation results of the background pixels in the third segmentation result may be used as segmentation results of the pixels in the first segmentation result. For foreground pixels in the coarse segmentation, segmentation results of the foreground pixels exist in both the third segmentation result and the fourth segmentation result, and the first image segmentation module may average the segmentation results of the foreground pixels in the third segmentation result and the fourth segmentation result as the first segmentation result.

In certain embodiments, the first image segmentation module may alternatively directly use an average value of the third segmentation result and the fourth segmentation result as the first segmentation result, where the fourth segmentation result further includes the segmentation results of the background pixels in the third segmentation result, and the background pixels are directly determined as the background. That is, in the second stage, the first image segmentation module does not perform classification on the background pixels in the first stage again, but directly determines the type of the background pixels as the background by default.

Descriptions are made above only by using an example in which step 3 is implemented in an averaging manner. In certain embodiments, the first image segmentation module may alternatively calculate a weighted sum of the third segmentation result and the fourth segmentation result to obtain the first segmentation result. A specific implementation of step 3 is not limited in the embodiments of the present disclosure.

For the second image segmentation module, in certain embodiments, the second image segmentation module may be implemented by using a deep residual network (ResNet). For example, the ResNet may be ResNet-18, ResNet-101, or ResNet-152, and which of these different types of ResNet may be chosen is not limited in the embodiments of the present disclosure.

In certain embodiments, the second image segmentation module may include at least one image segmentation submodule, and different image segmentation submodules have different depths. For example, the second image segmentation module may include two image segmentation submodules: ResNet-18 and ResNet-101, a depth of the ResNet-101 being greater than a depth of the ResNet-18. As explained in the foregoing step 203, the image information may further include the image number of the plurality of second sample images. In this way, when the image numbers of the second sample images are different, image segmentation submodules with different depths may be used for training, so as to avoid a problem of over-fitting phenomenon or poor segmentation capability of the trained model.

In certain particular embodiments, the second initial model may further store a correspondence between the image number and the image segmentation submodule. Accordingly, step 205 further includes that: the second initial model obtains image segmentation submodules corresponding to the image number as the second image segmentation module based on the image number of the plurality of second sample images, the image number of the plurality of second sample images being one type of information of the image information obtained in the foregoing step 203.

In certain embodiments, in an obtaining step of the second image segmentation module, a larger image number indicates a greater depth of an obtained image segmentation submodule. In this way, a situation of small data may be effectively dealt with, and the model may be trained when a sample number is relatively small, and therefore, an image segmentation model with a better segmentation effect is obtained.

Further, an example in which the second image segmentation module includes two image submodules is used, the obtaining step of the second image segmentation module may be that: when the image number of the plurality of second sample images is greater than a preset number, the second initial model obtains a first image segmentation submodule; and when the image number of the plurality of second sample images is less than or equal to the preset number, the second initial model obtains a second image segmentation submodule. A depth of the first image segmentation submodule is greater than a depth of the second image segmentation submodule. The preset number may be preset by a related technician, and a specific value of the preset number is not limited in the embodiments of the present disclosure.

For example, the first image segmentation submodule may be ResNet-101, and the second image segmentation submodule may be ResNet-18. An example in which the target number is 100 is used, the obtaining step of the second image segmentation module may be that: when the image number of the second sample images is less than 100, ResNet-18 may be used as a basic model; and when the image number of the second sample images is greater than 100, ResNet-101 may be used as a basic model. Structure tables of ResNet-18 and ResNet-101 are the following Table 1 and Table 2 respectively:

TABLE 1

| Layer name | ResNet-18 | |
|---|---|---|
| Conv1 | 7 × 7, 64, stride 2 | |
| Conv2_x | 3 × 3 max pool, stride 2 | |
| | 3 × 3, 64 | x2 blocks |
| | 3 × 3, 64 | |
| Conv3_x | 3 × 3, 128 | x2 blocks |
| | 3 × 3, 128 | |
| Conv4_x | 3 × 3, 256 | x2 blocks |
| | 3 × 3, 256 | |
| Conv5_x | 3 × 3, 512 | x2 blocks |
| | 3 × 3, 512 | |

TABLE 2

| Layer name | ResNet-101 | |
| --- | --- | --- |
| Conv1 | 7 × 7, 64, stride 2 | |
| Conv2_x | 3 × 3 max pool, stride 2 | |
| | 1 × 1, 64 | x3 blocks |
| | 3 × 3, 64 | |
| | 1 × 1, 256 | |
| Conv3_x | 1 × 1, 128 | x4 blocks |
| | 3 × 3, 128 | |
| | 1 × 1, 512 | |
| Conv4_x | 1 × 1, 256 | x23 blocks |
| | 3 × 3, 256 | |
| | 1 × 1, 1024 | |
| Conv5_x | 1 × 1, 512 | x3 blocks |
| | 3 × 3, 512 | |
| | 1 × 1, 2048 | |

Layer name is a name of a layer, Conv is an abbreviation for convolution, which means convolution, stride is a stride, blocks are blocks, and max pool is the maximum pooling. Using a structure of ResNet-18 as an example for a brief description, Conv1 may be a convolutional layer, a size of a convolution kernel is 7×7, a number of convolution kernels is 64, and a stride is 2. The first layer of Conv2_x is a pooling layer. After the pooling layer, two convolutional layers are included, and both of which include 64 3×3 convolution kernels. The two convolution kernels are one block. After the pooling layer of Conv2_x, two blocks are included, that is, Conv2_x includes one pooling layer and four convolutional layers. Table 1 and Table 2 only show structures of Conv1 to Conv5_x. Behind Conv5_x, there is actually a fully convolution (FC) layer that is not shown in Table 1 and Table 2, which is not described in detail herein.

In ResNet-18 and ResNet-101, the first layer of Conv3_x, that is, a stride of Conv3_1 is set to 2, a stride of the first layer of Conv4_x is set to 1, and a dilation is set to 2. In this case, an influence of downsampling on the segmentation results may be avoided, and a receptive field of each layer of ResNet-101 may be reserved. There are a rectified linear unit (ReLU) layer and a batch normalization layer after each of the foregoing convolutional layers, which is not described in detail in the embodiments of the present disclosure.

Conv1 to Conv5_x of ResNet-18 and ResNet-101 in the foregoing are all basic models, that is, backbone models of the second image segmentation module. After Conv5_3, the second sample may be further downsampled. In certain particular embodiments, a downsampling process may alternatively adopt multi-scale convolution kernels. For example, convolution kernels with five multiples of 1, 9, 19, 37, and 74 may be adopted. Generally, the downsampling process is usually implemented by using a pooling layer. In certain embodiments of the present disclosure, the downsampling process may be implemented by replacing some or all pooling layers with a depthwise convolution layer. The foregoing settings may alternatively be set or adjusted by a related technician according to an image segmentation requirement, which is not limited in the embodiments of the present disclosure.

Similar to content in step 200, the model parameter of the second initial model may be obtained through pre-training based on a plurality of first sample images. That is, parameters of the foregoing Conv_1 to Conv5_x may be obtained through pre-training based on a plurality of first sample images. In the pre-training process, the parameters of Conv1 to Conv5_x are mainly trained. For parameters of other layers behind, a Gaussian distribution value with a variance of 0.01 and a mean of 0 may be used as an initial value. Only one example is provided herein, and an initial value of another layer may alternatively be another value, and the setting of the initial value is not limited in the embodiments of the present disclosure.

A process of segmenting the second sample image by using the second image segmentation module may include the following step 1 and step 2:

Step 1. The second image segmentation module performs feature extraction on the second sample image based on the module parameter of the second image segmentation module.

The second image segmentation module may perform feature extraction on the second sample image based on the module parameter of the second image segmentation module obtained above to obtain a feature of the second sample image, for example, the feature may be in a feature map form.

Step 2. The second image segmentation module performs classification on each pixel of the second sample image based on the extracted feature to obtain a second segmentation result.

After the second image segmentation module extracts the feature, the foregoing downsampling process may be further performed, and after all the information is combined, the each pixel of the second sample image is classified to determine the second segmentation result.

In certain embodiments, the second image segmentation module is configured to segment a 2D image. If the second sample image is a 3D image, before a process of segmenting the second sample image by using the second image segmentation module, the second initial model further needs to process the second sample image, that is, process the 3D image into a 2D image, so as to input the 2D image into the second image segmentation module.

In certain particular embodiments, when it is determined that the first image is a 3D image according to the attribute information of the first image, and it is determined that the first image needs to be segmented by using the second image segmentation module, the second initial model processes the first image to obtain a plurality of first sub-images, and the first sub-images are 2D images. A process of processing a 3D image into a plurality of 2D images may adopt any 3D/2D conversion manner. For example, the 3D image may be sampled in a certain direction to obtain a plurality of 2D images. The 3D image may alternatively be sampled in all directions to obtain a plurality of 2D images. This not limited in the embodiments of the present disclosure.

Accordingly, the process of segmenting the first image by using the second image segmentation module includes: the second image segmentation module segments the plurality of first sub-images corresponding to the first image respectively based on the module parameter of the second image segmentation module, to obtain a plurality of second sub-segmentation results; and the second image segmentation module merges the plurality of sub-segmentation results to obtain the second segmentation result.

The foregoing step 202 to step 205 are a process of inputting the plurality of second sample images into the second initial model, for the second initial model to obtain image information of the plurality of second sample images, and segmenting each second sample image according to the image information and the first image segmentation module and the second image segmentation module in the second initial model. The second initial model includes both a module for segmenting 3D images and a module for segmenting 2D images, thereby improving the applicability and versatility of the second initial model. The applicability and versatility of the image segmentation model obtained through training based on the second initial model also become higher, and a variety of flexible segmentation manners are provided, thereby improving the accuracy of image segmentation.

206. The second initial model in the electronic device obtains a first segmentation error and a second segmentation error respectively based on the labels of the plurality of second sample images, the first segmentation result, and the second segmentation result.

After obtaining the first segmentation result and the second segmentation result, the second initial model may respectively determine whether the first segmentation result and the second segmentation result are accurate based on the label of the second sample image. In certain particular embodiments, whether the segmentation result is accurate may be determined according to the segmentation error. The first segmentation error is a segmentation error of the first segmentation result corresponding to the first image segmentation module, and the second segmentation error is a segmentation error of the second segmentation result corresponding to the second image segmentation module.

In certain embodiments, a process of obtaining the segmentation error of the first segmentation result is implemented by using a first loss function, that is, a process of obtaining the first segmentation error is implemented by using a first loss function, and a weight of a pixel of each type in the first loss function is determined based on a proportion of the pixel of the type that is in the image information of the plurality of second sample images in the plurality of second sample images. For example, the weight may be determined by using the following formula:

$$w_c = \frac{1}{N} \sum_{i=1}^{N} \frac{t_{c,i}}{n_i}$$

$w_c$ is a weight of a type c, N is an image number of the second sample images, i is an identifier of the second sample image, $t_{c,i}$ is a number of pixels of the type c in the second sample image i, $n_i$ is a number of all pixels in the second sample image i, and Σ is an accumulation function or a summation function.

In certain embodiments, a process of obtaining the segmentation error of the second segmentation result is implemented by using a second loss function, and a weight of the second loss function is determined based on an online hard example mining (OHEM) algorithm, which can effectively distinguish difficult samples in the second sample image, and reduce the influence of the hard samples on the model parameter, so that adverse effects caused by the imbalance of the sample labels can be dealt with.

For example, the second loss function may be a cross entropy function, and the first loss function may also be a cross entropy function, or be another loss function. In certain embodiments, the first loss function and the second loss function may be the same or different. In the embodiments of the present disclosure, which loss function of the first loss function and the second loss function is used and whether the first loss function and the second loss function are the same are not limited.

207. The second initial model in the electronic device adjusts the module parameters of the first image segmentation module and the second image segmentation module respectively based on the first segmentation error and the second segmentation error, and stops the adjustment until a first number of iterations is reached, to obtain the first image segmentation module and the second image segmentation module.

After the second initial model knows whether the first segmentation result and the second segmentation result are accurate, the module parameters of the two image segmentation modules may be adjusted, so that the module parameters after a plurality of adjustments may enable the segmentation results of the first image segmentation module and the second image segmentation module for the second sample image to be more accurate.

In certain embodiments, the first number of iterations is determined by cross-validation. In certain particular embodiments, the first number of iterations may be determined by k-fold cross-validation, for example, it may be determined by five-fold cross-validation. Using the five-fold cross-validation as an example, the second sample image may be divided into five parts, four of which are used as a training set, and the other part is used as a validation set, and then a plurality of training and validation are performed in another combination manner. After determining different combination manners, the second initial model may be trained and validated in the different combination manners at the same time. Therefore, the second initial model traverses all sample data by training and validating a plurality of combinations of sample data. The versatility of the trained model is better, and the segmentation result is more accurate. The cross-validation process may be employed to validate the trained model through validation data every time a certain number of iteration processes are performed. If the segmentation error meets a target condition, the cross-validation process may be stopped; and if the segmentation error does not meet the target condition, the foregoing iteration process may be continued. This is not described in detail in the embodiments of the present disclosure.

The foregoing step 203 to step 207 are a process of training the first image segmentation module and the second image segmentation module in the second initial model based on the plurality of second sample images, and stopping the training until the first number of iterations is reached, to obtain the module parameters of the first image segmentation module and the second image segmentation module. In this process, the module parameter of the first image segmentation module is obtained through adjustment based on the first segmentation error in each iteration process, and the module parameter of the second image segmentation module is obtained through adjustment based on the second segmentation error in the each iteration process. Every process that the second initial model performs the foregoing step 203 to step 207 is an iteration process. The second initial model may perform the foregoing process for a plurality of times so as to adjust the module parameters of the two image segmentation modules through a plurality of iterations, that is, implement a process of training the first image segmentation module and the second image segmentation module respectively.

In certain embodiments, in the foregoing process, when the electronic device adjusts the module parameters of the two image segmentation modules, the electronic device may also adjust a module parameter of the modality merging module, so as to obtain the module parameter of the modality merging module through training during the training process.

In a specific example, both the first image segmentation module and the second image segmentation module may be convolutional neural network models. In each iteration process described above, the model may calculate an error of a predicted result and transmit the error back to the convolutional neural network model, so as to solve a convolution template parameter w and a bias parameter b of the neural network model by using a gradient descent algorithm.

208. The second initial model in the electronic device segments the plurality of second sample images based on the first image segmentation module and the second image segmentation module that are obtained through training, to obtain the first segmentation result and the second segmentation result of the each second sample image.

Since the first image segmentation module and the second image segmentation module are respectively suitable for segmenting 3D images and 2D images, it is possible that for a second sample image, a result of the first image segmentation modules segmenting the second sample image is more accurate, and a segmentation result of the second sample image by using the second image segmentation module is quite inaccurate. In this way, if the second initial model directly uses a comprehensive result of the two modules, a final obtained segmentation result may be subject to the segmentation result of the second image segmentation module, which leads to a decrease in the accuracy of the final segmentation result.

After the first image segmentation module and the second image segmentation module are trained, the second initial model may further train a mixed strategy of the two modules based on the two trained modules, that is, for a second sample image, to train to select which one or both of the two modules to better segment the second sample image.

The second initial model may segment the second sample image by using the two trained modules respectively to obtain the first segmentation result and the second segmentation result, and evaluate the two segmentation results and a comprehensive segmentation result of the two segmentation results, to determine which module selection method gets a more accurate segmentation result.

209. The second initial model in the electronic device obtains a fifth segmentation result based on the first segmentation result and the second segmentation result.

The fifth segmentation result is a comprehensive segmentation result of the first segmentation result and the second segmentation result. In certain embodiments, a process of obtaining the fifth segmentation result by the second initial model may be that: the second initial model uses an average value of the first segmentation result and the second segmentation result as the fifth segmentation result, that is, for a probability that each pixel belongs to each type, an average value of probabilities in the first segmentation result and probabilities in the second segmentation result may be used as a probability in the fifth segmentation result.

In certain embodiments, the first segmentation result and the second segmentation result may further have weights accordingly, and the process of obtaining the fifth segmentation result by the second initial model may be that: the second initial model calculates a weighted sum of the first segmentation result and the second segmentation result to obtain the fifth segmentation result.

The foregoing only provides two examples, and the process of obtaining the fifth segmentation result may alternatively be implemented in another manner, which is not limited in the embodiments of the present disclosure.

210. The second initial model in the electronic device obtains the first segmentation error, the second segmentation error, and a third segmentation error based on the labels of the second sample images, and the first segmentation result, the second segmentation result, and the fifth segmentation result of the each second sample image.

The third segmentation error is a segmentation error of the fifth segmentation result. After obtaining the first segmentation result, the second segmentation result, and the fifth segmentation result, the second initial model may determine the segmentation error of each segmentation result based on the labels of the second sample images to determine whether the each segmentation result is accurate. The segmentation error of the each segmentation result may alternatively be obtained through the foregoing first loss function or second loss function, which is not described in detail in the embodiments of the present disclosure.

211. The second initial model in the electronic device adjusts a module selection parameter in the second initial model based on the first segmentation error, the segmentation error of the second segmentation result, and the third segmentation error, and stops the adjustment until a second number of iterations is reached, to get an image segmentation model.

The module selection parameter is used for determining to select at least one of the first image segmentation module and the second image segmentation module to segment the first image. In this way, the second initial model adjusts the module selection parameter based on the segmentation error of the each segmentation result. After a plurality of adjustments, the obtained image segmentation model may autonomously determine how to select the module to make the segmentation result of the second sample image more accurate.

The foregoing step 208 to step 211 collectively illustrate a process of training the module selection parameter in the second initial model based on the plurality of second sample images and the first image segmentation module and the second image segmentation module that are obtained through training, and stopping the training until the second number of iterations is reached, to obtain the image segmentation model. The module selection parameter is used for determining to select at least one of the first image segmentation module and the second image segmentation module to segment the first image. This process is a process of training the module selection parameter, and the module selection parameter is obtained through training based on the plurality of second sample images and the first image segmentation module and the second image segmentation module that are obtained through training.

In certain embodiments, the second number of iterations may also be determined by cross-validation. In certain particular embodiments, the second number of iterations may alternatively be determined by k-fold cross-validation, for example, may be determined by five-fold cross-validation. This is not described in detail in the embodiments of the present disclosure.

Based on the above, the model parameter of the second initial model includes the module parameter of the first image segmentation module, the module parameter of the second image segmentation module, and the module parameter and the module selection parameter of the modality merging module in the second initial model. Therefore, the foregoing step 202 to step 211 are a process of training the second initial model based on the plurality of second sample images to obtain the image segmentation model.

In certain embodiments, after segmenting the second sample image, the second initial model may further post-process the segmentation result to obtain a final segmented image. That is, the second initial model may obtain a third image corresponding to the second sample image based on at least one of the first segmentation result and the second segmentation result, so as to determine a final outputted second image corresponding to the second sample image based on the third image corresponding to the second sample image. The second image is the segmented image corresponding to the second sample image. In certain particular embodiments, the third image corresponding to the second sample image may be an image corresponding to the first segmentation result, or an image corresponding to the second segmentation result, or an image obtained after averaging or calculating a weighted sum of the first segmentation result and the second segmentation result. The postprocessing process may be performed based on the distribution information of the target region in the image information obtained in step 203.

That is, the second initial model may postprocess the third image corresponding to the second sample image based on a plurality of target regions in the third image corresponding to the second sample image and distribution information of the plurality of target regions indicated by the image information, to obtain the second image corresponding to the second sample image. The target region is a region in which pixels of a target type in the third image corresponding to the second sample image are located, and distribution types, a number, and size ranges of a plurality of target regions in the second image corresponding to the second sample image are all the same as the distribution information of the plurality of target regions. In this way, based on the prior knowledge, incorrectly classified pixels in the process of segmentation may be further corrected in the postprocessing process, so that the segmentation result is more accurate.

In certain particular embodiments, the postprocessing process may include any one or more of the following steps: the second initial model screens out, when or in response to determining a number or size ranges of the target regions in the third image corresponding to the second sample image are different from a number or size ranges of the plurality of target regions indicated by the image information, a part that does not meet the number or the size ranges of the plurality of target regions from the third image corresponding to the second sample image; or, the second initial model changes, when or in response to determining there is a background pixel inside any target region, the background pixel to a pixel of a target type corresponding to the target region.

Figure 7:
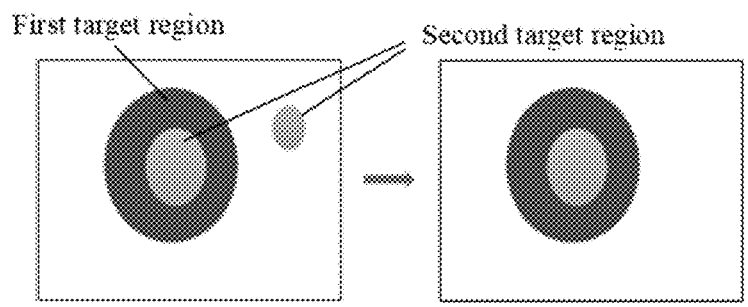
FIG. 7 is a schematic diagram of an image postprocessing manner according to one or more embodiments of the present disclosure.
Figure 8:
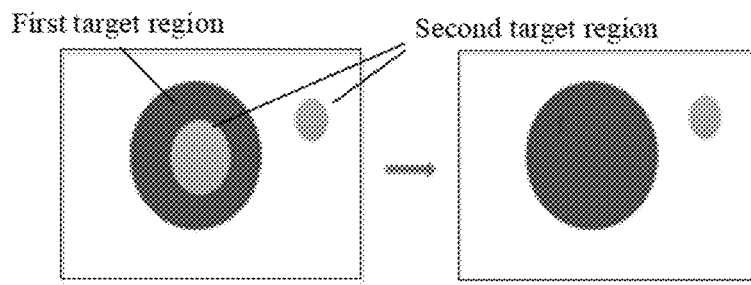
FIG. 8 is a schematic diagram of an image postprocessing manner according to one or more embodiments of the present disclosure.

For example, as shown in FIG. 7, if a distribution type of a first target region and a second target region is determined as a fully nested type according to the distribution information of the target region, that is, the second target region is to be inside the first target region. If there is a second target region outside the first target region in the third image corresponding to the second sample image, the second target region outside the first target region may be screened out. As shown in FIG. 8, if the distribution type of the first target region and the second target region is determined as a fully separated type according to the distribution information of the target region, that is, the second target region is to be outside the first target region. If there is a second target region inside the first target region in the third image corresponding to the second sample image, the second target region inside the first target region may be filled in as the first target region. Pixels in the target region are to be foreground pixels. If there is a background pixel in the target region in the third image corresponding to the second sample image, the background pixel may be corrected. For example, using a human tissue as an example, no holes are to exist in a human tissue part. If there is a hole in the human tissue part in the third image corresponding to the second sample image, the part may be filled in to correct the segmentation result. Other steps may alternatively be included, which are not listed one by one in the embodiments of the present disclosure.

At this point, the image segmentation model training is completed. In the training process, the image segmentation model obtains the image information of the plurality of second sample images. After step 211, the electronic device may invoke, when or in response to determining a first image to be segmented is obtained, the image segmentation model and segment the first image by using the image segmentation model according to the image information to output a second image. In certain particular embodiments, for how the image segmentation model segments the first image, reference may be made to the embodiment shown in FIG. 10 below, and the process of segmentation is similar to the image segmentation model training process, which is not described in detail in the embodiments of the present disclosure.

Figure 9:
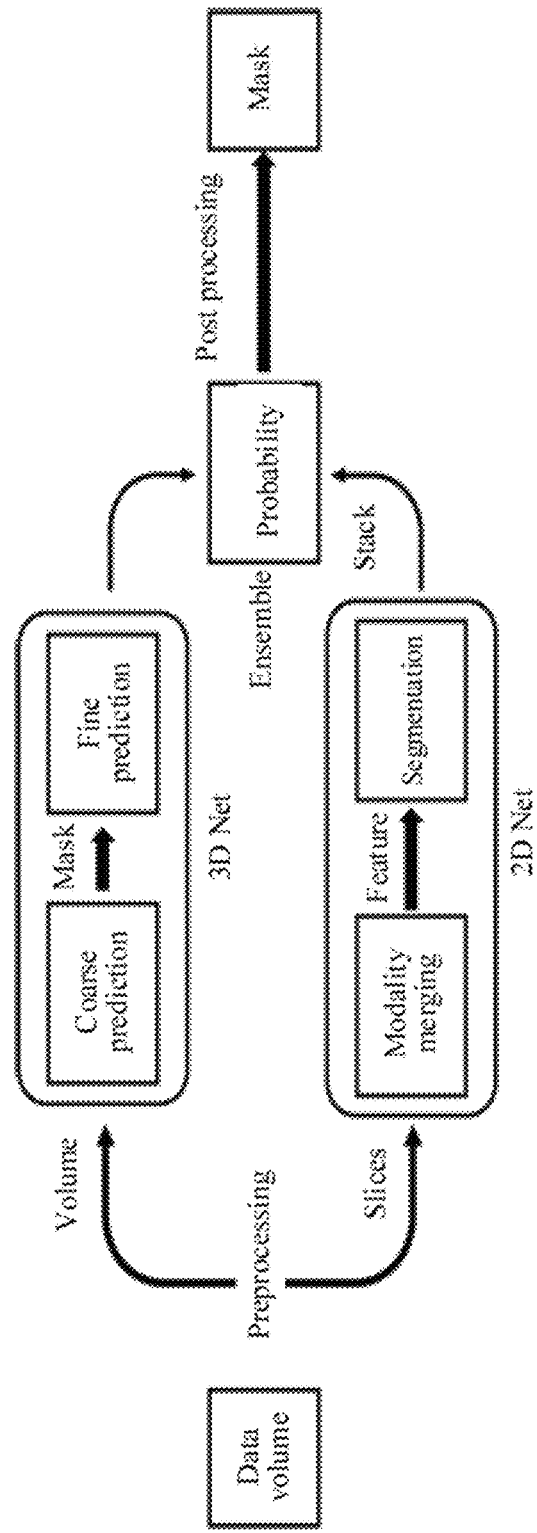
FIG. 9 is a schematic architectural diagram of an image segmentation model according to one or more embodiments of the present disclosure.

FIG. 9 is a schematic architectural diagram of an image segmentation model according to an embodiment of the present disclosure. Referring to FIG. 9, the image segmentation model includes a 3D network (Net) and a 2D Net, that is, the first image segmentation module and the second image segmentation module. The 3D Net may adopt a 2-stage flow design in which fine prediction is performed after coarse prediction, that is, fine segmentation is performed after coarse segmentation. For inputted sample data, the sample data may be inputted into the 3D Net and 2D Net. After probability maps are obtained through the two networks, different mixed strategies may be adopted to merge the probability maps. That is, a module selection parameter may be trained to determine to select one single network or two networks. Before the two networks perform segmentation, the image segmentation model may first preprocess the sample data. After the two networks segment the sample data, the image segmentation model may further postprocess results to obtain a final outputted segmented image.

The image segmentation model provided in the embodiments of the present disclosure has high versatility and is scenario-specific for medical images when the model is applicable to medical image segmentation. That is, the model is scenario-specific for images of human tissues and the model may be automatically trained. A user only needs to provide data for automatic training without manual parameter adjustment. In addition, the image segmentation model provided in the embodiments of the present disclosure has been validated in 10 different medical scenarios and has better segmentation effects in all the scenarios. The image segmentation model may be automatically extended to other medical implementation scenarios and have a strong universality of medical imaging.

In the embodiments of the present disclosure, the initial model is pre-trained through images of a plurality of human tissues, and therefore, the initial model has prior knowledge about human tissues. When an image of a human tissue needs to be segmented, the pre-trained model may be directly trained based on the image of the human tissue without manually analyzing the image of the human tissue and then redesigning a model based on an analysis result, which effectively improves the versatility, applicability, and practicability of the image segmentation model. Further, the image segmentation model includes a first image segmentation module and a second image segmentation module, which can accurately segment both 3D images and 2D images, thereby further improving the versatility, applicability, and practicability of the image segmentation model, and also improving the segmentation accuracy of the image segmentation model.

An optional embodiment of the present disclosure may be formed by using any combination of all the foregoing optional technical solutions, and details are not described herein again.

Figure 10:
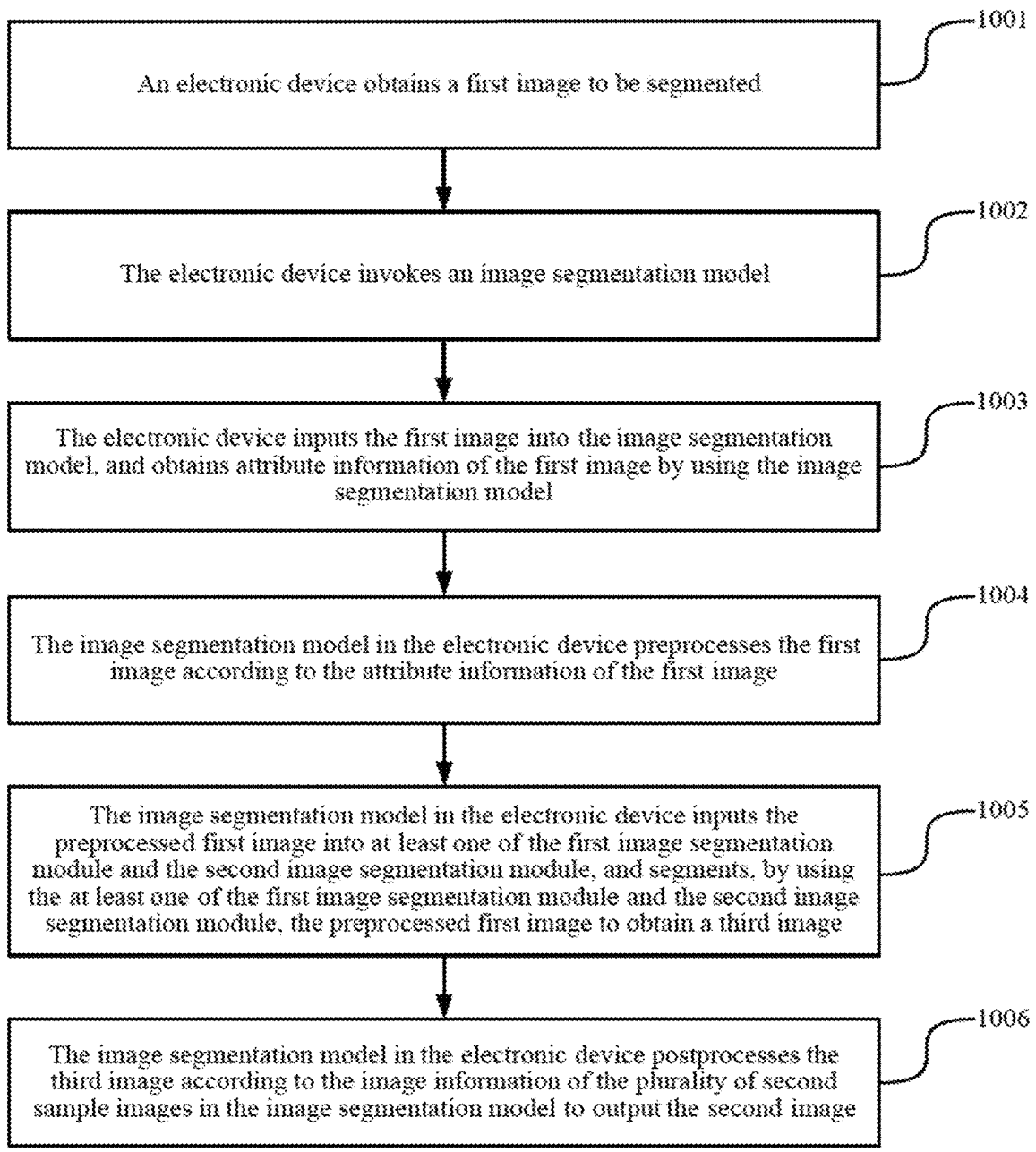
FIG. 10 is a flowchart of an image segmentation method according to one or more embodiments of the present disclosure.

FIG. 10 is a flowchart of an image segmentation method according to an embodiment of the present disclosure. The image segmentation method is applicable to an electronic device, and the electronic device may be the electronic device 101 in the foregoing implementation environment. In the embodiments of the present disclosure, a process of invoking the image segmentation model once a first image to be segmented is obtained, and segmenting the first image by using the image segmentation model according to the image information, to output a second image is mainly described. Description is made only by using an example in which the image segmentation model includes a first image segmentation module and a second image segmentation module in the embodiments of the present disclosure. Referring to FIG. 10, the image segmentation method may include the following steps.

1001: An electronic device obtains a first image to be segmented.

The electronic device performs step 1001 of detecting an image segmentation operation, and may receive a first image to be segmented imported by a user, or may receive an image segmentation request sent by another electronic device, and the image segmentation request carries a first image to be segmented. The first image to be segmented is extracted from the image segmentation request, or the image segmentation request may carry related information of the first image, and the electronic device may perform step 1001 based on the related information. The electronic device may alternatively obtain the first image to be segmented through the imaging principle. A specific obtaining manner and obtaining time of the first image to be segmented are not limited in the embodiments of the present disclosure.

For example, another electronic device may obtain the first image to be segmented through the imaging principle and send the first image to be segmented to the electronic device. The electronic device obtains the first image to be segmented, and the first image may be an image of the foregoing target human tissue. In this way, the following step may be performed, that is, the first image may be segmented by using an image segmentation model obtained through training according to sample images of the target human tissue.

1002: The electronic device invokes an image segmentation model.

The image segmentation model includes a first image segmentation module and a second image segmentation module. The first image segmentation module and the second image segmentation module each correspond to one segmentation algorithm, the first image segmentation module is configured to segment a 3D image, and the second image segmentation module is configured to segment a 2D image.

The image segmentation model may be prestored in the electronic device. In certain embodiments, the electronic device is the electronic device shown in FIG. 2, that is, the image segmentation model stored in the electronic device is obtained through training on the electronic device. In certain embodiments, the electronic device is not the electronic device shown in FIG. 2, that is, the image segmentation model may be obtained through training on another electronic device, and the electronic device may obtain the trained image segmentation model from the another electronic device. The image segmentation model may not be stored in the electronic device. When the electronic device obtains the first image to be segmented and needs to segment the first image, the image segmentation model may be invoked from another electronic device in real time. This is not limited in the embodiments of the present disclosure.

1003: The electronic device inputs the first image into the image segmentation model, and obtains attribute information of the first image by using the image segmentation model.

Similar to the content in the foregoing step 203, the image segmentation model may obtain the attribute information of the first image. A difference is that the image segmentation model is a trained model instead of a second initial model, and when the image segmentation model is used, the attribute information of the first image may be obtained without obtaining an image number and distribution information of a target region. Similarly, the attribute information may include a grayscale range, a modality number, a size range, and the like. This is not limited in the embodiments of the present disclosure.

1004. The image segmentation model in the electronic device preprocesses the first image according to the attribute information of the first image.

Similar to the content in step 204, a preprocessing process of the first image by using the image segmentation model may also include any one or more of the following steps:

Step 1. The image segmentation model deletes the abnormal pixel when or in response to determining there is an abnormal pixel in the first image according to the attribute information.

Step 2: The image segmentation model performs normalization processing on the first image when or in response to determining that a grayscale range of the first image from which the abnormal pixel has been deleted according to the attribute information is greater than a target range, to adjust the grayscale range of the first image to be within the target range.

Step 3: The image segmentation model subtracts a target image mean from each pixel value of the first image when or in response to determining that a channel number of the first image is greater than 1 according to the attribute information.

Step 4: The image segmentation model inputs the first image into a modality merging module when or in response to determining that a modality number of the first image is greater than 1 according to the attribute information, and screens, by using the modality merging module, a plurality of pixel values of the first image, to obtain a target number of pixel values of the preprocessed first image, a modality number of the preprocessed first image being 1.

Step 1 to step 4 in step 1004 are all in a similar way with step 1 to step 4 in step 204 described above. This is not described in detail in the embodiments of the present disclosure.

1005. The image segmentation model in the electronic device inputs the preprocessed first image into at least one of the first image segmentation module and the second image segmentation module, and segments, by using the at least one of the first image segmentation module and the second image segmentation module, the preprocessed first image to obtain a third image.

Since a module suitable for segmenting the first image may only be the first image segmentation module, or may only be the second image segmentation module, or both the two modules, the image segmentation model may select at least one of the first image segmentation module and the second image segmentation module based on a module selection parameter to segment the first image. In certain particular embodiments, step 1005 may include the following three cases:

Case 1. The image segmentation model segments, by using the first image segmentation module, the first image based on a module selection parameter of the image segmentation model to obtain a first segmentation result, and obtains the third image based on the first segmentation result, the first segmentation result being used for indicating a probability that each pixel in the first image belongs to each of at least two types.

Case 2. The image segmentation model segments, by using the second image segmentation module, the first image based on a module selection parameter of the image segmentation model to obtain a second segmentation result, and obtains the third image based on the second segmentation result, the second segmentation result being used for indicating a probability that each pixel in the first image belongs to each of at least two types.

Case 3. The image segmentation model segments, by using the first image segmentation module and the second image segmentation module respectively, the first image based on a module selection parameter of the image segmentation model to obtain a first segmentation result and a second segmentation result, and obtains the third image based on the first segmentation result and the second segmentation result.

A process of obtaining the third image based on the first segmentation result and the second segmentation result is also in a similar way with the content in the foregoing step 211. The foregoing three cases correspond to three processes of obtaining the third image respectively, that is, the third image is an image corresponding to the first segmentation result, the third image is an image corresponding to the second segmentation result, and the third image is an image obtained by averaging or calculating a weighted sum of the first segmentation result and the second segmentation result. This is not described in detail in the embodiments of the present disclosure.

Similar to the content in step 205, a process of segmenting the first image by using the first image segmentation module may be that: the first image segmentation module performs two classifications on the first image based on a module parameter of the first image segmentation module to obtain a first segmentation result, classification objects of the first classification in the two classifications being all pixels of the first image, and classification objects of the second classification being foreground pixels in a result of the first classification. In certain particular embodiments, the following step 1 to step 3 may be included:

Step 1. The first image segmentation module performs classification on the each pixel of the first image based on the module parameter of the first image segmentation module to obtain a third segmentation result, the third segmentation result being used for indicating a probability that the each pixel of the first image belongs to each of the at least two types, the at least two types including foreground and background, and the foreground being any type other than the background.

Step 2. The first image segmentation module performs classification on each foreground pixel in the third segmentation result based on the third segmentation result and the module parameter of the first image segmentation module to obtain a fourth segmentation result, the fourth segmentation result being used for indicating a probability that the each foreground pixel in the third segmentation result belongs to each of the at least two types.

Step 3. The first image segmentation module obtains the first segmentation result based on the third segmentation result and the fourth segmentation result.

Similar to the content in the foregoing step 205, a process of segmenting the first image by using the second image segmentation module may include the following step 1 and step 2:

Step 1. The second image segmentation module performs feature extraction on the first image based on a module parameter of the second image segmentation module.

Step 2. The second image segmentation module performs classification on the each pixel of the first image based on an extracted feature to obtain a second segmentation result.

Similarly, when it is determined that the first image is a 3D image according to the attribute information of the first image, and it is determined that the first image needs to be segmented by using the second image segmentation module, the image segmentation model may process the first image to obtain a plurality of first sub-images, and the first sub-images are 2D images. Accordingly, the process of segmenting the first image by using the second image segmentation module includes: the second image segmentation module segments the plurality of first sub-images corresponding to the first image respectively based on the module parameter of the second image segmentation module, to obtain a plurality of second sub-segmentation results; and the second image segmentation module merges the plurality of sub-segmentation results to obtain the second segmentation result.

1006. The image segmentation model in the electronic device postprocesses the third image according to the image information of the plurality of second sample images in the image segmentation model to output the second image.

Similar to the postprocessing process in step 211, the image segmentation model may alternatively postprocess the third image. Similarly, the postprocessing process may alternatively be that: the image segmentation model postprocesses the third image based on a plurality of target regions in the third image and distribution information of the plurality of target regions indicated by the image information, to obtain the second image. The target region is a region in which pixels of a target type in the third image are located, and distribution types, a number, and size ranges of a plurality of target regions in the second image are the same as the distribution information of the plurality of target regions.

Similar to the postprocessing process in step 211, in step 1006, the image segmentation model may alternatively perform any one or more of the following steps: the image segmentation model screens out, when or in response to determining a number or size ranges of the target regions in the third image are different from a number or size ranges of the plurality of target regions indicated by the image information, a part that does not meet the number or the size ranges of the plurality of target regions from the third image; or the image segmentation model changes, when or in response to determining there is a background pixel inside any target region, the background pixel to a pixel of a target type corresponding to the target region.

The foregoing step 1003 to step 1006 are a process of segmenting the first image based on the image information and at least one of the first image segmentation module and the second image segmentation module in the image segmentation model to output the second image. After obtaining the second image, the electronic device may store the second image, and may alternatively store the first image and the second image correspondingly. If the electronic device performs the foregoing process of image segmentation based on an image segmentation request of another electronic device, the second image may alternatively be sent to the another electronic device.

In the embodiments of the present disclosure, description is made only by using an example in which the image segmentation model includes a first image segmentation module and a second image segmentation module. The image segmentation model may alternatively include only one or more image segmentation modules, and the image segmentation procedure is the same as the foregoing process, which are not described in detail herein.

In the embodiments of the present disclosure, the initial model is pre-trained through images of a plurality of human tissues, and therefore, the initial model has prior knowledge about human tissues. When an image of a human tissue needs to be segmented, the pre-trained model may be directly trained based on the image of the human tissue without manually analyzing the image of the human tissue and then redesigning a model based on an analysis result. The image segmentation model obtained according to the foregoing method may accurately segment the image of the human tissue, which effectively improves the versatility, applicability, and practicability of the image segmentation method, and also effectively improves the accuracy of the image segmentation method.

An optional embodiment of the present disclosure may be formed by using any combination of all the foregoing optional technical solutions, and details are not described herein again.

It is to be understood that the steps in the embodiments of the present disclosure are not necessarily performed sequentially in a sequence indicated by step numbers. Unless explicitly specified in this specification, execution of the steps is not strictly limited, and the steps may be performed in another sequence. Moreover, at least some of the steps according to certain embodiments may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

In an embodiment, an electronic device is further provided. The electronic device includes an image segmentation apparatus, the image segmentation apparatus includes various modules, and each module may be all or partially implemented by software, hardware, or a combination thereof.

Figure 11:
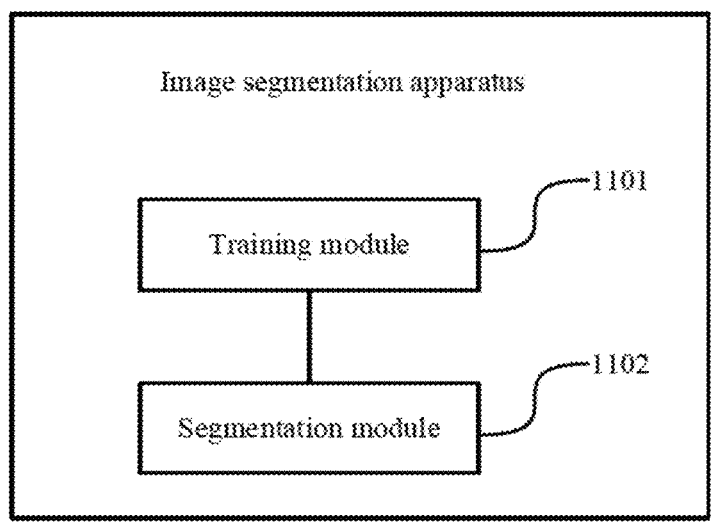
FIG. 11 is a schematic structural diagram of an image segmentation apparatus according to one or more embodiments of the present disclosure.

FIG. 11 is a schematic structural diagram of an image segmentation apparatus according to an embodiment of the present disclosure. Referring to FIG. 11, the apparatus includes:a training module 1101, configured to pre-train a first initial model based on a plurality of first sample images to obtain a second initial model, the plurality of first sample images including images of a plurality of human tissues, and the second initial model including distribution information of a plurality of target regions corresponding to the plurality of human tissues; the training module 1101 being further configured to train the second initial model based on a plurality of second sample images to obtain an image segmentation model, the plurality of second sample images being images of a target human tissue, the image segmentation model obtaining image information of the plurality of second sample images in a training process, and the image information of the plurality of second sample images including at least distribution information of a plurality of target regions corresponding to the target human tissue; and a segmentation module 1102, configured to invoke the image segmentation model once a first image to be segmented is obtained, and segment, by using the image segmentation model, the first image according to the image information to output a second image.

In certain embodiments, the first initial model, the second initial model, and the image segmentation model each include a first image segmentation module and a second image segmentation module, the first image segmentation module and the second image segmentation module each correspond to one segmentation algorithm, the first image segmentation module is configured to segment a 3D image, and the second image segmentation module is configured to segment a 2D image; and accordingly, the segmentation module 1102 is configured to segment the first image based on the image information and at least one of the first image segmentation module and the second image segmentation module in the image segmentation model to output the second image.

In certain embodiments, the segmentation module 1102 is configured to: preprocess the first image according to attribute information of the first image; input the preprocessed first image into at least one of the first image segmentation module and the second image segmentation module, and segment, by using the at least one of the first image segmentation module and the second image segmentation module, the preprocessed first image to obtain a third image; and postprocess the third image based on the image information to output the second image.

In certain embodiments, the segmentation module 1102 is configured to: delete the abnormal pixel when or in response to determining that there is an abnormal pixel in the first image according to the attribute information; perform normalization processing on the first image when or in response to determining that a grayscale range of the first image from which the abnormal pixel has been deleted according to the attribute information is greater than a target range, to adjust the grayscale range of the first image to be within the target range; subtract a target image mean from each pixel value of the first image when or in response to determining that a channel number of the first image is greater than 1 according to the attribute information; and input the first image into a modality merging module when or in response to determining that a modality number of the first image is greater than 1 according to the attribute information, and screen, by using the modality merging module, a plurality of pixel values of the first image, to obtain a target number of pixel values of the preprocessed first image, a modality number of the preprocessed first image being 1.

In certain embodiments, the segmentation module 1102 is configured to postprocess the third image based on a plurality of target regions in the third image and distribution information of the plurality of target regions indicated by the image information, to obtain the second image, the target region being a region in which pixels of a target type in the third image are located, and distribution types, a number, and size ranges of a plurality of target regions in the second image being all the same as the distribution information of the plurality of target regions.

In certain embodiments, the segmentation module 1102 is configured to: screen out, when or in response to determining a number or size ranges of the target regions in the third image are different from a number or size ranges of the plurality of target regions indicated by the image information, a part that does not meet the number or the size ranges of the plurality of target regions from the third image; or change, when or in response to determining there is a background pixel inside any target region, the background pixel to a pixel of the target type corresponding to the target region.

In certain embodiments, the segmentation module 1102 is configured to: segment, by using the first image segmentation module, the first image based on a module selection parameter of the image segmentation model to obtain a first segmentation result, and obtain the third image based on the first segmentation result, the first segmentation result being used for indicating a probability that each pixel in the first image belongs to each of at least two types; or segment, by using the second image segmentation module, the first image based on a module selection parameter of the image segmentation model to obtain a second segmentation result, and obtain the third image based on the second segmentation result, the second segmentation result being used for indicating a probability that each pixel in the first image belongs to each of at least two types; or segment, by using the first image segmentation module and the second image segmentation module respectively, the first image based on a module selection parameter of the image segmentation model to obtain a first segmentation result and a second segmentation result, and obtain the third image based on the first segmentation result and the second segmentation result.

In certain embodiments, the segmentation module 1102 is configured to: perform two classifications on the first image based on a module parameter of the first image segmentation module to obtain a first segmentation result, classification objects of the first classification in the two classifications being all pixels of the first image, and classification objects of the second classification being foreground pixels in a result of the first classification.

In certain embodiments, the segmentation module 1102 is configured to: perform feature extraction on the first image based on a module parameter of the second image segmentation module; and perform classification on the each pixel of the first image based on an extracted feature to obtain a second segmentation result.

In certain embodiments, the training module 1101 is configured to: train the first image segmentation module and the second image segmentation module in the second initial model based on the plurality of second sample images, and stop the training until a first number of iterations is reached, to obtain module parameters of the first image segmentation module and the second image segmentation module; and train a module selection parameter in the second initial model based on the plurality of second sample images and the first image segmentation module and the second image segmentation module that are obtained through training, and stop the training until a second number of iterations is reached, to obtain the image segmentation model, the module selection parameter being used for determining to select at least one of the first image segmentation module and the second image segmentation module to segment the first image.

In certain embodiments, the image information further includes attribute information of each second sample image; and accordingly, the training module 1101 is further configured to preprocess the each second sample image based on the attribute information of the each second sample image, and input the plurality of preprocessed second sample images into the first image segmentation module and the second image segmentation module.

In certain embodiments, the module parameter of the first image segmentation module is obtained through adjustment based on the first segmentation error in each iteration process, and the first segmentation error is a segmentation error of the first segmentation result corresponding to the first image segmentation module. A process of obtaining the first segmentation error is implemented by using a first loss function, and a weight of a pixel of each type in the first loss function is determined based on a proportion of the pixel of the type that is in the image information of the plurality of second sample images in the plurality of second sample images.

The module parameter of the second image segmentation module is obtained through adjustment based on the second segmentation error in the each iteration process, and the second segmentation error is a segmentation error of the second segmentation result corresponding to the second image segmentation module. A process of obtaining the second segmentation error may be implemented by using a second loss function, and a weight of the second loss function is determined based on an OHEM algorithm.

The first number of iterations and the second number of iterations are determined by cross-validation.

In certain embodiments, the image information further includes an image number of the plurality of second sample images.

Accordingly, the training module 1101 is further configured to obtain, based on the image number, image segmentation submodules corresponding to the image number as the second image segmentation module for training, the second image segmentation module including at least one image segmentation submodule, and different image segmentation submodules having different depths.

According to the apparatus provided in the embodiments of the present disclosure, the initial model is pre-trained through images of a plurality of human tissues, and therefore, the initial model has prior knowledge about human tissues. When an image of a human tissue image needs to be segmented, the pre-trained model may be directly trained based on the image of the human tissue without manually analyzing the image of the human tissue and then redesigning a model based on an analysis result. The image segmentation model obtained according to the foregoing method may accurately segment the image of the human tissue, which effectively improves the versatility, applicability, and practicability of the image segmentation method, and also effectively improves the accuracy of the image segmentation method.

When the image segmentation apparatus provided in the foregoing embodiment segments an image, it is illustrated with an example of division of each functional module. During implementation, the function distribution may be implemented by different functional modules according to requirements, that is, an internal structure of the electronic device is divided into different functional modules, to implement all or some of the functions described above. In addition, the image segmentation apparatus provided in the foregoing embodiment belongs to the same concept as the image segmentation method embodiments. For a specific implementation process, reference may be made to the method embodiments, and details are not described herein again.

Figure 12:
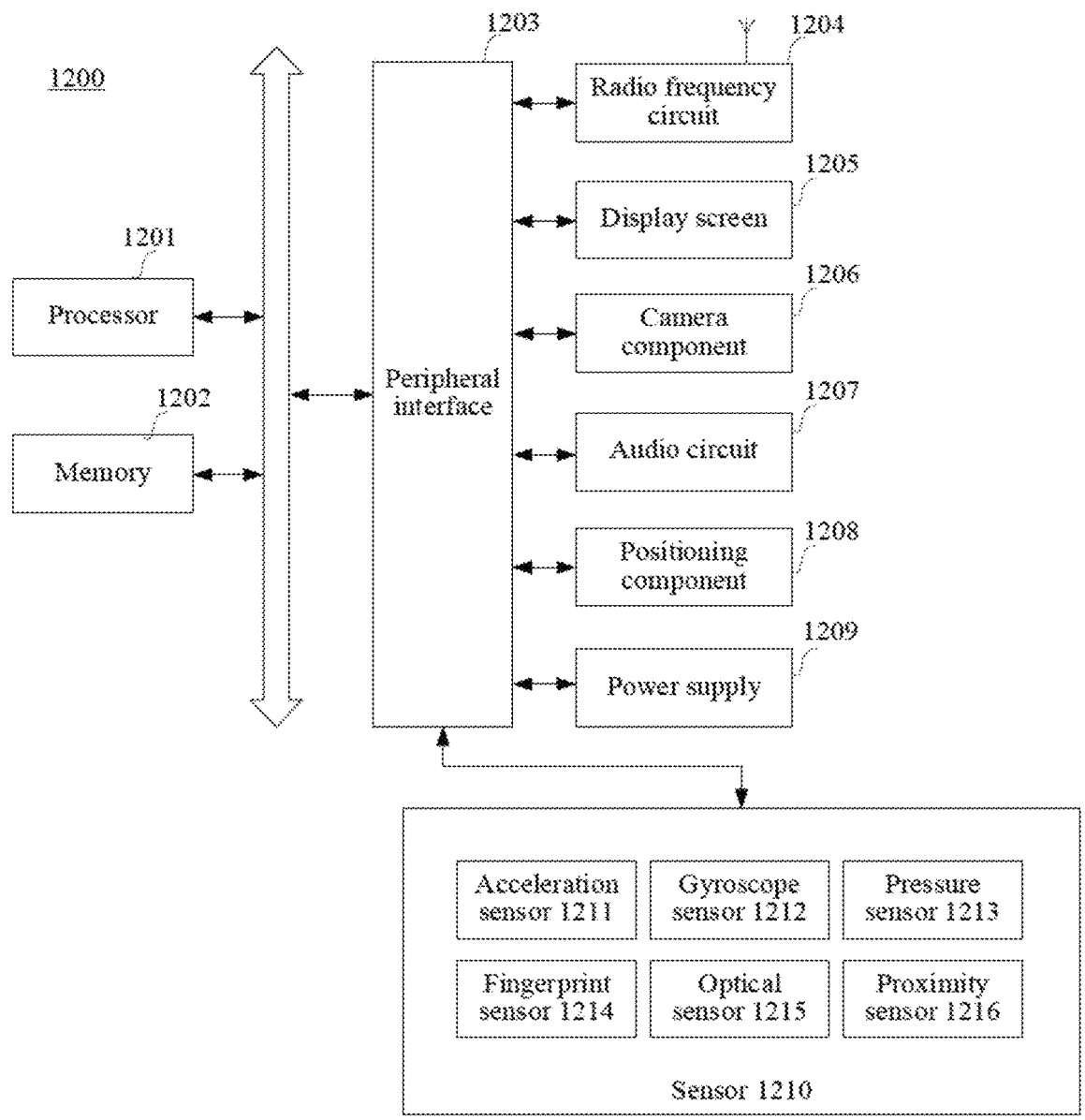
FIG. 12 is a schematic structural diagram of a terminal according to one or more embodiments of the present disclosure.
Figure 13:
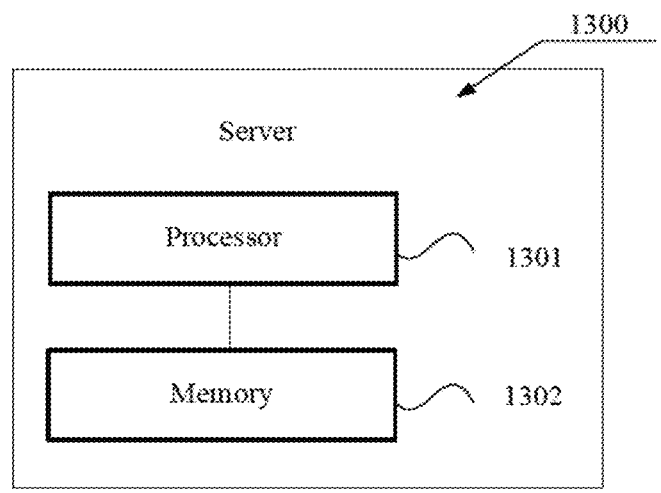
FIG. 13 is a schematic structural diagram of a server according to one or more embodiments of the present disclosure.

The electronic device may be provided as a terminal shown in FIG. 12, or may be provided as a server shown in FIG. 13. This is not limited in the embodiments of the present disclosure.

FIG. 12 is a schematic structural diagram of a terminal according to an embodiment of the present disclosure. The terminal 1200 may be a smartphone, a tablet computer, a moving picture experts group audio layer III (MP3) player, a moving picture experts group audio layer IV (MP4) player, a notebook computer, or a desktop computer. The terminal 1200 may also be referred to as a user equipment, a portable terminal, a laptop terminal, a desktop terminal, or another name.

Generally, the terminal 1200 includes a processor 1201 and a memory 1202.

The processor 1201 may include one or more processing cores, for example, may be a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is a processor configured to process data in an awake state, also referred to as a central processing unit (CPU), and the coprocessor is a low-power processor configured to process data in an idle state. In certain embodiments, the processor 1201 may be integrated with a graphics processing unit (GPU). The GPU is configured to render and draw content that needs to be displayed on a display. In certain embodiments, the processor 1201 may further include an artificial intelligence (AI) processor. The AI processor is configured to process a computing operation related to machine learning.

The memory 1202 may include one or more computer-readable storage media. The computer-readable storage medium may be non-transient. The memory 1202 may further include a high-speed random access memory and a non-volatile memory, such as one or more magnetic disk storage devices or flash storage devices. In certain embodiments, the non-transient computer-readable storage medium in the memory 1202 is configured to store at least one instruction, and the at least one instruction is configured to be executed by the processor 1201 to implement the image segmentation method or the image segmentation model training method according to the method embodiments of the present disclosure.

In certain embodiments, the terminal 1200 may alternatively include: a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. In certain particular embodiments, the peripheral includes: at least one of a radio frequency (RF) circuit 1204, a display screen 1205, a camera component 1206, an audio circuit 1207, a positioning component 1208, and a power supply 1209.

The peripheral interface 1203 may be configured to connect the at least one peripheral related to input/output (I/O) to the processor 1201 and the memory 1202. In certain embodiments, the processor 1201, the memory 1202, and the peripheral interface 1203 are integrated on the same chip or circuit board. In certain other embodiments, any one or two of the processors 1201, the memory 1202, and the peripheral interface 1203 may be implemented on a separate chip or circuit board. This is not limited in this embodiment.

The RF circuit 1204 is configured to receive and transmit an RF signal, also referred to as an electromagnetic signal. The RF circuit 1204 communicates with a communication network and another communication device by using the electromagnetic signal. The RF circuit 1204 converts an electric signal into an electromagnetic signal for transmission, or converts a received electromagnetic signal into an electric signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other terminals through at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In certain embodiments, the RF circuit 1204 may also include a circuit related to near field communication (NFC). This is not limited in the present disclosure.

The display screen 1205 is configured to display a user interface (UI). The UI may include a graph, text, an icon, a video, and any combination thereof. When the display screen 1205 is a touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In certain embodiments, there may be one display screen 1205, disposed on a front panel of the terminal 1200. In certain other embodiments, there may be at least two display screens 1205, respectively disposed on different surfaces of the terminal 1200 or designed in a foldable shape. In certain embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to capture an image or a video. Optionally, the camera component 1206 includes a front-facing camera and a rear-facing camera. Generally, the front-facing camera is disposed on the front panel of the terminal, and the rear-facing camera is disposed on a back surface of the terminal. In certain embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In certain embodiments, the camera component 1206 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1207 may include a microphone and a loudspeaker. The microphone is configured to collect sound waves of a user and an environment, and convert the sound waves into electric signals and input the electric signals into the processor 1201 for processing, or input the electric signals into the RF circuit 1204 to implement speech communication. For the purpose of stereo collection or noise reduction, there may be a plurality of microphones, disposed at different portions of the terminal 1200 respectively. The microphone may be further an array microphone or an omni-directional collection type microphone. The loudspeaker is configured to convert electric signals from the processor 1201 or the RF circuit 1204 into sound waves. The loudspeaker may be a conventional thin-film loudspeaker or a piezoelectric ceramic loudspeaker. When the loudspeaker is the piezoelectric ceramic loudspeaker, electric signals not only may be converted into sound waves that can be heard by human, but also may be converted into sound waves that cannot be heard by human for ranging and the like. In certain embodiments, the audio circuit 1207 may further include an earphone jack.

The positioning component 1208 is configured to determine a current geographic location of the terminal 1200, to implement a navigation or a location based service (LBS). The positioning component 1208 may be a positioning component based on the global positioning system (GPS) of the United States, a the BeiDou Navigation Satellite System (BDS) of China, the GLONASS System of Russia, or the GALILEO System of the European Union.

The power supply 1209 is configured to supply power to components in the terminal 1200. The power supply 1209 may be an alternating current, a direct current, a disposable battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In certain embodiments, the terminal 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect the magnitude of acceleration on three coordinate axes of a coordinate system established with the terminal 1200. For example, the acceleration sensor 1211 may be configured to detect components of gravity acceleration on the three coordinate axes. The processor 1201 may control, according to a gravity acceleration signal collected by the acceleration sensor 1211, the touch display screen 1205 to display the user interface in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may cooperate with the acceleration sensor 1211 to collect a 3D action by the user on the terminal 1200. The processor 1201 may implement the following functions according to the data collected by the gyroscope sensor 1212: motion sensing (such as changing the UI according to a tilt operation of the user), image stabilization at shooting, game control, and inertial navigation.

The pressure sensor 1213 may be disposed at a side frame of the terminal 1200 and/or a lower layer of the touch display screen 1205. When the pressure sensor 1213 is disposed at the side frame of the terminal 1200, a holding signal of the user on the terminal 1200 may be detected. The processor 1201 performs left and right hand recognition or a quick operation according to the holding signal collected by the pressure sensor 1213. When the pressure sensor 1213 is disposed at the lower layer of the touch display screen 1205, the processor 1201 controls, according to a pressure operation of the user on the touch display screen 1205, an operable control on the UI. The operable control includes at least one of a button control, a scroll-bar control, an icon control, and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. When identifying that the user's identity is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front surface, a back surface, or a side surface of the terminal 1200. When a physical button or a vendor logo is disposed on the terminal 1200, the fingerprint 1214 may be integrated with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. In certain particular embodiments, when the ambient light intensity is relatively high, the display luminance of the touch display screen 1205 is increased. When the ambient light intensity is relatively low, the display luminance of the touch display screen 1205 is reduced. In another embodiment, the processor 1201 may further dynamically adjust a camera parameter of the camera component 1206 according to the ambient light intensity collected by the optical sensor 1215.

The proximity sensor 1216, also referred to as a distance sensor, is generally disposed on the front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes smaller, the touch display screen 1205 is controlled by the processor 1201 to switch from a screen-on state to a screen-off state. When or after it is determined that the proximity sensor 1216 detects that the distance between the user and the front surface of the terminal 1200 gradually becomes larger, the touch display screen 1205 is controlled by the processor 1201 to switch from the screen-off state to the screen-on state.

A person skilled in the art may understand that the structure shown in FIG. 12 does not constitute a limitation to the terminal 1200, and the terminal may include more or fewer components than those shown in the figure, or some components may be combined, or a different component deployment may be used. FIG. 13 is a schematic structural diagram of a server according to an embodiment of the present disclosure. The server 1300 may vary greatly due to different configurations or performance, and may include one or more CPUs 1301 and one or more memories 1302. The memory 1302 stores at least one instruction, and the at least one instruction is loaded and executed by the processor 1301 to implement the image segmentation method or the image segmentation model training method provided in the foregoing method embodiments. The server may further include components such as a wired or wireless network interface, a keyboard, and an I/O interface, to facilitate inputs/outputs. The server may further include another component configured to implement functions of a device, and details are not described herein again.

Figure 14:
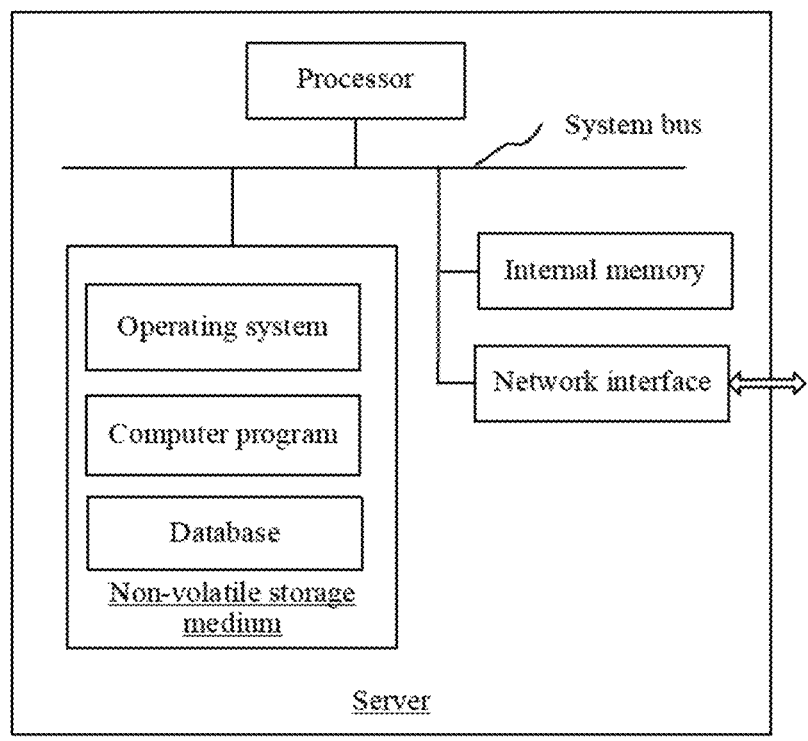
FIG. 14 is a schematic structural diagram of a server according to one or more embodiments of the present disclosure.
Figure 15:
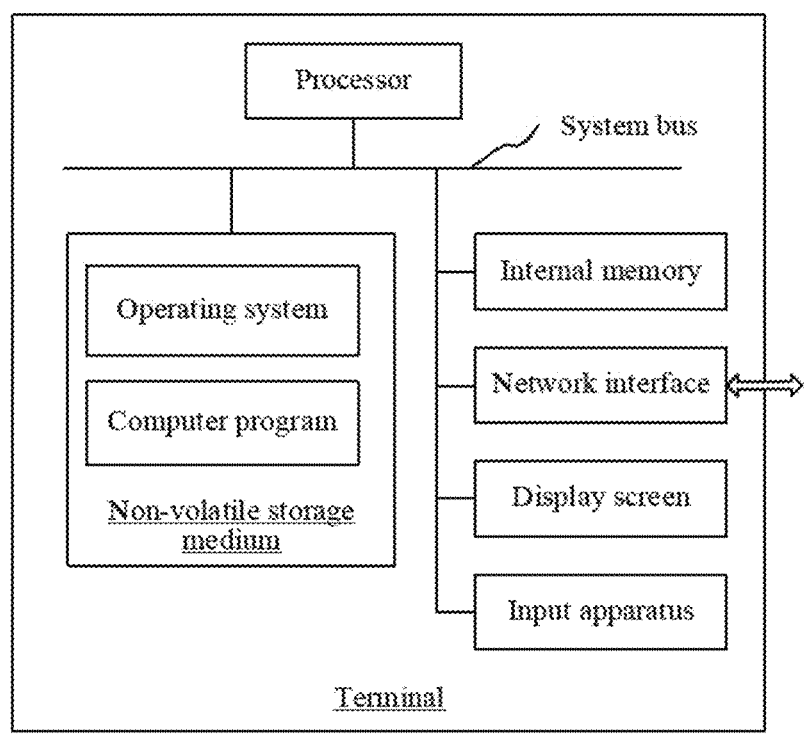
FIG. 15 is a schematic structural diagram of a terminal according to one or more embodiments of the present disclosure.

The electronic device may be provided as a server shown in FIG. 14, or may be provided as a terminal shown in FIG. 15. This is not limited in the embodiments of the present disclosure.

The electronic device may be provided as a server shown in FIG. 14. As shown in FIG. 14, the server includes a processor, a memory, a network interface, and a database that are connected by using a system bus. The processor of the electronic device is configured to provide computing and control capabilities. The memory of the electronic device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store image data. The network interface of the electronic device is configured to communicate with an external terminal through a network connection. The computer program is executed by the processor to implement an image segmentation method or an image segmentation model training method.

The electronic device may be provided as a terminal shown in FIG. 15. As shown in FIG. 15, the terminal includes a processor, a memory, a network interface, a display screen, and an input apparatus that are connected by using a system bus. The processor of the electronic device is configured to provide computing and control capabilities. The memory of the electronic device includes a non-volatile storage medium and an internal memory. The non-volatile storage medium stores an operating system and a computer program. The internal memory provides an environment for running of the operating system and the computer program in the non-volatile storage medium. The network interface of the electronic device is configured to communicate with an external terminal through a network connection. The computer program is executed by the processor to implement an image segmentation method or an image segmentation model training method. The display screen of the electronic device may be a liquid crystal display screen or an electronic ink display screen. The input apparatus of the electronic device may be a touch layer covering the display screen, or may be a key, a trackball, or a touch pad disposed on a housing of the electronic device, and may further be an external keyboard, a touch pad, a mouse, or the like.

A person skilled in the art may understand that, in the structures shown in FIG. 14 and FIG. 15, only block diagrams of partial structures related to a solution in the present disclosure are shown, and the structures do not constitute a limitation to the server and the terminal to which the solution in the present disclosure is applied. In certain particular embodiments, the server and the terminal may include more components or fewer components than those shown in the figure, or some components may be combined, or a different component deployment may be used.

In an embodiment, the image segmentation apparatus provided in the present disclosure may be implemented in a form of a computer-readable instruction, and the computer-readable instruction may be run on the server shown in FIG. 14 or run on the terminal shown in FIG. 15. The memory of the server or the terminal may store program modules forming the image segmentation apparatus, such as the training module 1101 and the segmentation module 1102. A computer-readable instruction formed by the program modules causes the processor to perform the steps in the image segmentation method or the image segmentation model training method in the embodiments of the present disclosure described in this specification.

An embodiment of the present disclosure provides a computer-readable storage medium, storing a computer-readable instruction, the computer-readable instruction being loaded and executed by a processor to perform operations performed in the image segmentation method or the image segmentation model training method according to the foregoing embodiments.

A person of ordinary skill in the art may understand that all or some of the procedures of the methods in the foregoing embodiments may be implemented by a computer program instructing related hardware. The program may be stored in a non-volatile computer-readable storage medium. When the program runs, the procedures of the foregoing method embodiments may be performed. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

After considering the specification and practicing the present disclosure disclosed herein, a person skilled in the art would easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes may be made without departing from the scope of the present disclosure.

What is claimed is:

1. An image segmentation method, the method comprising:
   pre-training, by an electronic device, a first initial model based on a plurality of first sample images to obtain a second initial model, the plurality of first sample images including images of a plurality of human tissues, and the second initial model including distribution information of a plurality of target regions corresponding to the plurality of human tissues;
   training, by the electronic device, the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue; and feeding, by the electronic device, a first image to the image segmentation model, and segmenting, by using the image segmentation model, the first image according to the image information to output a second image, wherein one of the first initial model, the second initial model, and the image segmentation model includes a first image segmentation module and a second image segmentation module, the first image segmentation module and the second image segmentation module each correspond to a segmentation algorithm, including a gradient descent algorithm or an online hard example mining algorithm, the first image segmentation module is configured to segment a three-dimensional (3D) image, and the second image segmentation module is configured to segment a two-dimensional (2D) image.

2. The method according to claim 1, wherein segmenting, by using the image segmentation model, the first image according to the image information to output the second image comprises:

segmenting, by the electronic device, the first image based on the image information and at least one of the first image segmentation module and the second image segmentation module in the image segmentation model to output the second image.

3. The method according to claim 2, wherein the segmenting the first image based on the image information and at least one of the first image segmentation module and the second image segmentation module in the image segmentation model to output the second image comprises:

preprocessing, by the electronic device, the first image according to attribute information of the first image to obtain a preprocessed first image;

inputting, by the electronic device, the preprocessed first image into at least one of the first image segmentation module and the second image segmentation module, and segmenting, by using the at least one of the first image segmentation module and the second image segmentation module, the preprocessed first image to obtain a third image; and postprocessing, by the electronic device, the third image based on the image information to output the second image.

4. The method according to claim 3, wherein the preprocessing, by the electronic device, the first image according to the attribute information of the first image comprises:

in response to determining there is an abnormal pixel in the first image according to the attribute information, deleting, by the electronic device, the abnormal pixel from the first image;

in response to determining a grayscale range of the first image is greater than a targe range, adjusting, by the electronic device, the grayscale range of the first image to be within the target range;

in response to determining a channel number of the first image is greater than 1 according to the attribute information, subtracting, by the electronic device, a target image mean from each pixel value of the first image; and in response to determining a modality number of the first image is greater than 1 according to the attribute information, inputting, by the electronic device, the first image into a modality merging module, and screening, by using the modality merging module, a plurality of pixel values of the first image, to obtain a target number of pixel values of the preprocessed first image, a modality number of the preprocessed first image being 1.

5. The method according to claim 3, wherein the postprocessing, by the electronic device, the third image based on the image information to output the second image comprises:

postprocessing, by the electronic device, the third image based on a plurality of target regions in the third image and distribution information of the plurality of target regions indicated by the image information, to obtain the second image.

6. The method according to claim 5, wherein the postprocessing, by the electronic device, the third image based on the plurality of target regions in the third image and distribution information of the plurality of target regions indicated by the image information comprises:

removing, by the electronic device, a portion of the third image in which a number range or a size range of the plurality of target regions differs than a number range or a size range of the plurality of target regions indicated by the image information.

7. The method according to claim 5, wherein the postprocessing, by the electronic device, the third image based on the plurality of target regions in the third image and distribution information of the plurality of target regions indicated by the image information comprises:

in response to determining there is a background pixel inside any target region, changing, by the electronic device, the background pixel to a pixel of the target type corresponding to the target region.

8. The method according to claim 3, wherein the segmenting, by the at least one of the first image segmentation module and the second image segmentation module, the first image to obtain the third image comprises:

segmenting, by the electronic device by using the first image segmentation module, the first image based on a module selection parameter of the image segmentation model to obtain a first segmentation result, and obtaining the third image based on the first segmentation result.

9. The method according to claim 3, wherein the segmenting, by the at least one of the first image segmentation module and the second image segmentation module, the first image to obtain the third image comprises:

segmenting, by the electronic device by using the second image segmentation module, the first image based on a module selection parameter of the image segmentation model to obtain a second segmentation result, and obtaining the third image based on the second segmentation result.

10. The method according to claim 3, wherein the segmenting, by the at least one of the first image segmentation module and the second image segmentation module, the first image to obtain the third image comprises:

segmenting, by the electronic device by using the first image segmentation module and the second image segmentation module, the first image based on a module selection parameter of the image segmentation model to respectively obtain a first segmentation result and a second segmentation result, and obtaining the third image based on the first segmentation result and the second segmentation result.

11. The method according to claim 2, wherein segmenting the first image by using the first image segmentation module comprises:
performing, by the electronic device, a first and a second classifications on the first image based on a module parameter of the first image segmentation module to obtain a first segmentation result, classification objects of the first classification including pixels of the first image, and classification objects of the second classification including foreground pixels in a result of the first classification; and wherein segmenting the first image by using the second image segmentation module comprises:
performing, by the electronic device, feature extraction on the first image based on a module parameter of the second image segmentation module; and
performing, by the electronic device, classification on each pixel of the first image based on an extracted feature to obtain a second segmentation result.

12. The method according to claim 2, wherein training, by the electronic device, the second initial model based on the plurality of second sample images comprises:
training, by the electronic device, the first image segmentation module and the second image segmentation module in the second initial model based on the plurality of second sample images, and stopping the training until a first number of iterations is reached, to obtain module parameters of the first image segmentation module and the second image segmentation module; and
training, by the electronic device, a module selection parameter in the second initial model based on the plurality of second sample images and the first image segmentation module and the second image segmentation module that are obtained through training, and stopping the training until a second number of iterations is reached, to obtain the image segmentation model, the module selection parameter being used for determining to select at least one of the first image segmentation module and the second image segmentation module to segment the first image.

13. The method according to claim 2, wherein the image information further comprises attribute information of each second sample image, and wherein training, by the electronic device, the second initial model based on the plurality of second sample images further comprises:
preprocessing, by the electronic device, the each second sample image based on the attribute information of the each second sample image, and inputting the plurality of preprocessed second sample images into the first image segmentation module and the second image segmentation module.

14. The method according to claim 2, wherein the image information further includes an image number of the plurality of second sample images, and wherein training, by the electronic device, the second initial model based on the plurality of second sample images further comprises:
obtaining, by the electronic device based on the image number, image segmentation submodules corresponding to the image number as the second image segmentation module for training, the second image segmentation module including at least one image segmentation submodule, and different image segmentation submodules having different depths.

15. An image segmentation apparatus, comprising: a memory;
and a processor coupled to the memory, the processor being configured to perform:
pre-training a first initial model based on a plurality of first sample images to obtain a second initial model, the plurality of first sample images including images of a plurality of human tissues, and the second initial model including distribution information of a plurality of target regions corresponding to the plurality of human tissues;
training the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue; and
feeding a first image to the image segmentation model, and segmenting, by using the image segmentation model, the first image according to the image information to output a second image, wherein one of the first initial model, the second initial model, and the image segmentation model includes a first image segmentation module and a second image segmentation module, the first image segmentation module and the second image segmentation module each correspond to a segmentation algorithm, including a gradient descent algorithm or an online hard example mining algorithm, the first image segmentation module is configured to segment a three-dimensional (3D) image, and the second image segmentation module is configured to segment a two-dimensional (2D) image.

16. The apparatus of claim 15, wherein wherein segmenting, by using the image segmentation model, the first image according to the image information to output the second image comprises:
segmenting, by the electronic device, the first image based on the image information and at least one of the first image segmentation module and the second image segmentation module in the image segmentation model to output the second image.

17. The apparatus of claim 16, wherein the segmenting the first image based on the image information and at least one of the first image segmentation module and the second image segmentation module in the image segmentation model to output the second image comprises:
preprocessing, by the electronic device, the first image according to attribute information of the first image to obtain a preprocessed first image;
inputting, by the electronic device, the preprocessed first image into at least one of the first image segmentation module and the second image segmentation module, and segmenting, by using the at least one of the first image segmentation module and the second image segmentation module, the preprocessed first image to obtain a third image; and
postprocessing, by the electronic device, the third image based on the image information to output the second image.

18. The apparatus of claim 17, wherein the preprocessing, by the electronic device, the first image according to the attribute information of the first image comprises:

in response to determining there is an abnormal pixel in the first image according to the attribute information, deleting, by the electronic device, the abnormal pixel from the first image;

in response to determining a grayscale range of the first image is greater than a targe range, adjusting, by the electronic device, the grayscale range of the first image to be within the target range;

in response to determining a channel number of the first image is greater than 1 according to the attribute information, subtracting, by the electronic device, a target image mean from each pixel value of the first image; and in response to determining a modality number of the first image is greater than 1 according to the attribute information, inputting, by the electronic device, the first image into a modality merging module, and screening, by using the modality merging module, a plurality of pixel values of the first image, to obtain a target number of pixel values of the preprocessed first image, a modality number of the preprocessed first image being 1.

19. The apparatus of claim 17, wherein the postprocessing, by the electronic device, the third image based on the image information to output the second image comprises:

postprocessing, by the electronic device, the third image based on a plurality of target regions in the third image and distribution information of the plurality of target regions indicated by the image information, to obtain the second image.

20. A non-transitory electronic-readable storage medium storing computer program instructions executable by at least one processor to perform:

pre-training a first initial model based on a plurality of first sample images to obtain a second initial model, the plurality of first sample images including images of a plurality of human tissues, and the second initial model including distribution information of a plurality of target regions corresponding to the plurality of human tissues;

training the second initial model based on a plurality of second sample images to obtain an image segmentation model, the plurality of second sample images including images of a target human tissue, the image segmentation model obtaining image information of the plurality of second sample images in a training process, and the image information of the plurality of second sample images including at least distribution information of a plurality of target regions corresponding to the target human tissue; and feeding a first image to the image segmentation model, and segmenting, by using the image segmentation model, the first image according to the image information to output a second image, wherein one of the first initial model, the second initial model, and the image segmentation model includes a first image segmentation module and a second image segmentation module, the first image segmentation module and the second image segmentation module each correspond to a segmentation algorithm, including a gradient descent algorithm or an online hard example mining algorithm, the first image segmentation module is configured to segment a three-dimensional (3D) image, and the second image segmentation module is configured to segment a two-dimensional (2D) image.

* * * * *